United States Patent
Gubbi et al.

(10) Patent No.: US 7,093,015 B2
(45) Date of Patent: Aug. 15, 2006

(54) METHOD AND APPARATUS FOR ACCESSING A WIRELESS COMPUTER NETWORK COMMUNICATION CHANNEL BY ACCESSING QUIET INTERVALS IN NETWORK FRAMES

(75) Inventors: Rajugopal Gubbi, Fair Oaks, CA (US); Natarajan Ekambaram, Rancho Cordova, CA (US); Nirmalendu Bikash Patra, Cameron Park, CA (US)

(73) Assignee: Cirrus Logic, Inc., Austin, TX (US)

( * ) Notice: Subject to any disclaimer, the term of this patent is extended or adjusted under 35 U.S.C. 154(b) by 211 days.

(21) Appl. No.: 10/361,318

(22) Filed: Feb. 10, 2003

(65) Prior Publication Data

US 2005/0262241 A1    Nov. 24, 2005

Related U.S. Application Data

(63) Continuation of application No. 09/151,579, filed on Sep. 11, 1998, now abandoned.

(51) Int. Cl.
G06F 15/16 (2006.01)

(52) U.S. Cl. ...................... 709/225; 709/232

(58) Field of Classification Search ................ 709/224, 709/225, 226, 232
See application file for complete search history.

(56) References Cited

U.S. PATENT DOCUMENTS

| | | | |
|---|---|---|---|
| 4,251,880 A | | 2/1981 | Baugh et al. |
| 4,383,315 A | * | 5/1983 | Torng |
| 4,429,383 A | * | 1/1984 | Finck et al. |
| 4,482,999 A | * | 11/1984 | Janson et al. |
| 4,530,092 A | * | 7/1985 | Hafer |
| 4,608,685 A | * | 8/1986 | Jain et al. |
| 4,700,019 A | | 10/1987 | Kerschner et al. |

(Continued)

FOREIGN PATENT DOCUMENTS

EP    0 288 904    4/1988

(Continued)

Primary Examiner—Andrew Caldwell
Assistant Examiner—Stephan Willett
(74) Attorney, Agent, or Firm—Thompson & Knight LLP; James J. Murphy

(57) ABSTRACT

Admission to a computer network is provided by having a network device listen to a communication channel communicatively coupling two or more components of the computer network. In some cases, the network device may then transmit a connection request to a controller of the computer network within a designated time slot of the communication channel. In other cases, the connection request may be transmitted without requiring the network device to be polled. The connection request may be confirmed by transmitting the connection request from the controller to network device periodically, until a response from the first network device is received by the controller. Upon confirmation, the controller may send to the network device, a connection agreements package, which includes information regarding time slots within the communication channel to be used by the controller for transmitting information to the first network device. The connection agreement packet may further include information regarding time slots within the communication channel to be used by the network device when transmitting information to the controller. Thus, during normal communications, data from the network device destined for the controller may be transmitted in the time slots designated in the connection agreement packet. In some cases, the information sent between the network device and the controller includes packets and, in such cases, the connection agreement may include information regarding a maximum number of bytes the network device can send or expect to receive in each packet, for each type of data included in a packet.

9 Claims, 12 Drawing Sheets

U.S. PATENT DOCUMENTS

| | | | |
|---|---|---|---|
| 4,718,061 A * | 1/1988 | Turner | |
| 4,759,017 A * | 7/1988 | Allan et al. | |
| 4,799,052 A | 1/1989 | Near et al. | |
| 4,887,266 A | 12/1989 | Neve et al. | |
| 4,905,234 A | 2/1990 | Childress et al. | |
| 5,260,944 A * | 11/1993 | Tomabechi | |
| 5,280,498 A | 1/1994 | Tymes et al. | |
| 5,295,140 A | 3/1994 | Crisler et al. | |
| 5,297,144 A | 3/1994 | Gilbert et al. | |
| 5,355,374 A | 10/1994 | Hestel et al. | |
| 5,408,506 A | 4/1995 | Mincher et al. | |
| 5,509,049 A | 4/1996 | Peterson | |
| 5,513,184 A * | 4/1996 | Vannucci | |
| 5,548,296 A | 8/1996 | Matsuno | |
| 5,550,848 A | 8/1996 | Doshi et al. | |
| 5,572,546 A | 11/1996 | Serfaty et al. | |
| 5,583,852 A * | 12/1996 | Ikeda et al. | |
| 5,606,729 A * | 2/1997 | D'Amico et al. | |
| 5,696,761 A | 12/1997 | Kos et al. | |
| 5,696,903 A * | 12/1997 | Mahany | 709/228 |
| 5,699,276 A | 12/1997 | Roos | |
| 5,699,532 A | 12/1997 | Barrett et al. | |
| 5,721,693 A | 2/1998 | Song | |
| 5,729,541 A | 3/1998 | Hamalainen et al. | |
| 5,734,646 A | 3/1998 | Hamalainen et al. | |
| 5,740,542 A | 4/1998 | Leeper et al. | |
| 5,761,083 A | 6/1998 | Brown, Jr. et al. | |
| 5,796,728 A | 8/1998 | Rondeau et al. | |
| 5,878,277 A | 3/1999 | Ohta | |
| 5,889,771 A | 3/1999 | Altvater | |
| 5,898,831 A | 4/1999 | Hall et al. | |
| 5,901,067 A | 5/1999 | Kao et al. | |
| 5,905,442 A | 5/1999 | Mosebrook et al. | |
| 5,907,544 A | 5/1999 | Rypinski | |
| 5,909,183 A | 6/1999 | Borgstahl et al. | |
| 5,922,047 A | 7/1999 | Newlin et al. | |
| 5,956,487 A | 9/1999 | Venkatraman et al. | |
| 5,966,376 A | 10/1999 | Rakib et al. | |
| 5,987,590 A | 11/1999 | Wing So | |
| 6,003,070 A | 12/1999 | Frantz | |
| 6,016,311 A | 1/2000 | Gilbert et al. | |
| 6,016,322 A | 1/2000 | Goldman | |
| 6,021,324 A | 2/2000 | Sizer, II et al. | |
| 6,052,594 A | 4/2000 | Chuang et al. | |
| 6,075,782 A * | 6/2000 | Mizumoto et al. | 370/347 |
| 6,094,425 A * | 7/2000 | Auger et al. | |
| 6,130,886 A * | 10/2000 | Ketseoglou et al. | 370/347 |
| 6,141,336 A * | 10/2000 | Bauchot et al. | 370/348 |
| 6,411,629 B1 * | 6/2002 | Bentall et al. | |
| 6,665,311 B1 * | 12/2003 | Kondylis et al. | |

FOREIGN PATENT DOCUMENTS

| | | |
|---|---|---|
| EP | 0 475 682 | 9/1991 |
| EP | 0 750 284 | 6/1996 |
| EP | 0 752 764 | 6/1996 |
| EP | 0 861 008 | 2/1998 |
| GB | 2 320 162 A | 6/1998 |
| WO | WO 95/35002 | 12/1995 |
| WO | WO 98/00993 | 1/1998 |
| WO | WO 98/01002 | 1/1998 |
| WO | WO 98/24250 | 6/1998 |
| WO | WO 98/27667 | 6/1998 |
| WO | WO 98/27747 | 6/1998 |
| WO | WO 98/33347 | 7/1998 |
| WO | PCT/US99/20478 | 9/1999 |

* cited by examiner

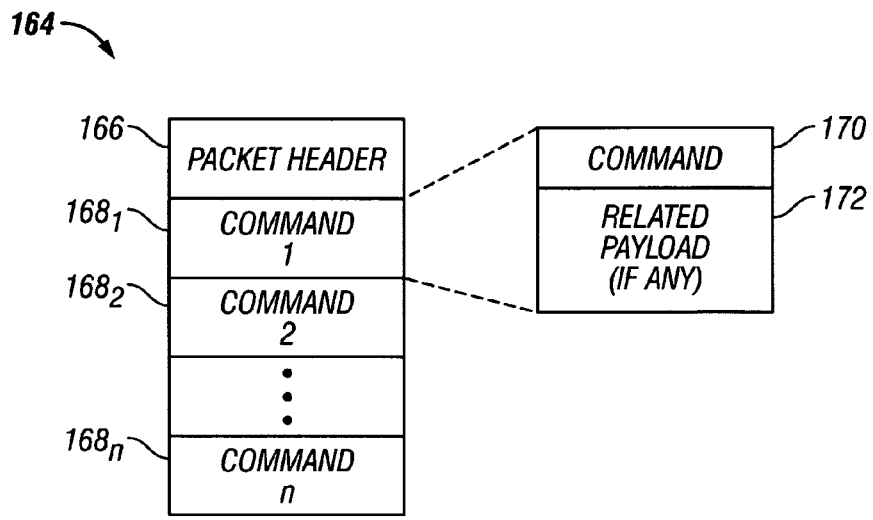
FIG. 13
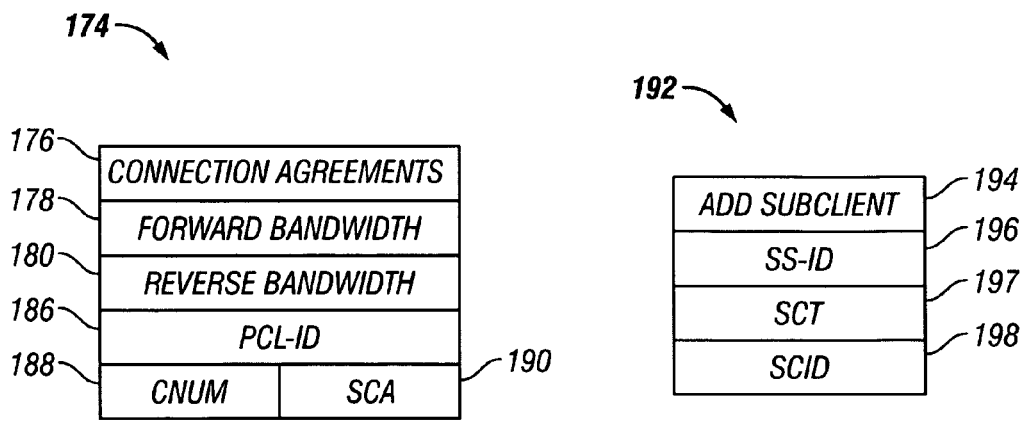
FIG. 14
FIG. 15

METHOD AND APPARATUS FOR ACCESSING A WIRELESS COMPUTER NETWORK COMMUNICATION CHANNEL BY ACCESSING QUIET INTERVALS IN NETWORK FRAMES

This application is a continuation of U.S. patent application Ser. No. 09/151,579, filed Sep. 11, 1998, now abandoned entitled METHOD AND APPARATUS FOR ACCESSING A COMPUTER NETWORK COMMUNICATION CHANNEL.

FIELD OF THE INVENTION

The present invention relates generally to a scheme for communications within a computer network and, in particular, to such communications as occur between a central server and a number of client units across a wireless link.

BACKGROUND

Modern computer networks allow for inter-communication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home environment, computers have traditionally been used as stand-alone devices. More recently, however, there have been some steps taken to integrate the home computer with other appliances. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Further, interference from existing appliances, such as televisions, cellular telephones, wireless telephones and the like, may be experienced. Thus, analog wireless communication links offer less than optimum performance for a home environment and it would be desirable to have an improved scheme for wireless network communications in such areas.

SUMMARY OF THE INVENTION

Improved wireless communications within a computer network are provided, in one embodiment, through a method of seeking admission to the network. In general, a first network device listens to a communication channel communicatively coupling two or more components of the computer network. Then, the first network device transmits a connection request to a controller of the computer network within a designated time slot of the communication channel. The connection request may be confirmed by transmitting the connection request from the controller to first network device periodically, until a response from the first network device is received by the controller. Upon such confirmation, the controller may send to the first network device, a connection agreements package, which includes information regarding time slots within the communication channel to be used by the controller for transmitting information to the first network device. The connection agreement packet may further include information regarding time slots within the communication channel to be used by the first network device when transmitting information to the controller. Thus, during normal communications, data from the first network device destined for the controller may be transmitted in the time slots designated in the connection agreement packet. In some cases, the information sent between the first network device and the controller includes packets and, in such cases, the connection agreement packet will preferably include information regarding the maximum number of bytes the first network device can send or expect to receive in each packet, for each type of data included in a packet.

In a further embodiment, admission to a computer network may be sought by first determining, at a first network device, whether a communication channel used for communicatively coupling two or more components of the computer network is actively being utilized by the components of the computer network; and then, transmitting, from the first network device, a message within the communication channel at a time depending upon whether the communication channel is actively being utilized or not. If the communication channel is not actively being utilized, the first network device may listen to the communication channel for a response to its message. If no response is received, the first network device may change to a new communication channel and repeat this procedure. Once an active channel is found, the first network device may negotiate for access to the active communication channel.

In a further embodiment, network access may be obtained through a process in which a network controller listens for a connection request message transmitted by a first component seeking access to a communication channel communicatively coupling one or more network components to the network controller; and, upon receipt of the connection request message, negotiates bandwidth requirements within the communication channel with the first component. Such negotiating may include exchanging further connection request messages between the network controller and the first component to synchronize the first component to the network controller. This may require reallocating bandwidth within the communication channel among the one or more network components and the first component. Authenticating the first component by comparing a client identifier provided by the first component against a list of known clients prior to negotiating bandwidth requirements may also be accommodated.

In yet another embodiment, a communication channel communicatively coupling components of a computer network may be accessed by first acting as a communication master, to request access to the communication channel, and subsequently acting as a communication slave, once the request for access to the communication channel has been recognized. In such a scheme, acting as a communication master may include transmitting the request for access to the communication channel without first being polled to transmit the request. In other cases, acting as a communication master may include listening for a quiet time slot in the communication channel and transmitting the request for access to the communication channel within the quiet time slot. In general, acting as a communication slave includes synchronizing to a communication protocol according to terms provided by a network controller. Such terms may include an indication of time slots within the communication channel during which the first component may expect to receive information from the network controller and during which the first component may transmit information to the network controller.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which:

FIG. 13 illustrates an exemplary payload structure for a command packet in accordance with one embodiment of the present invention;

FIG. 14 illustrates an exemplary structure for a Connection Agreement command packet in accordance with one embodiment of the present invention;

FIG. 15, illustrates an exemplary structure for an Add Subclient command packet in accordance with one embodiment of the present invention;

DETAILED DESCRIPTION

Figure 1:
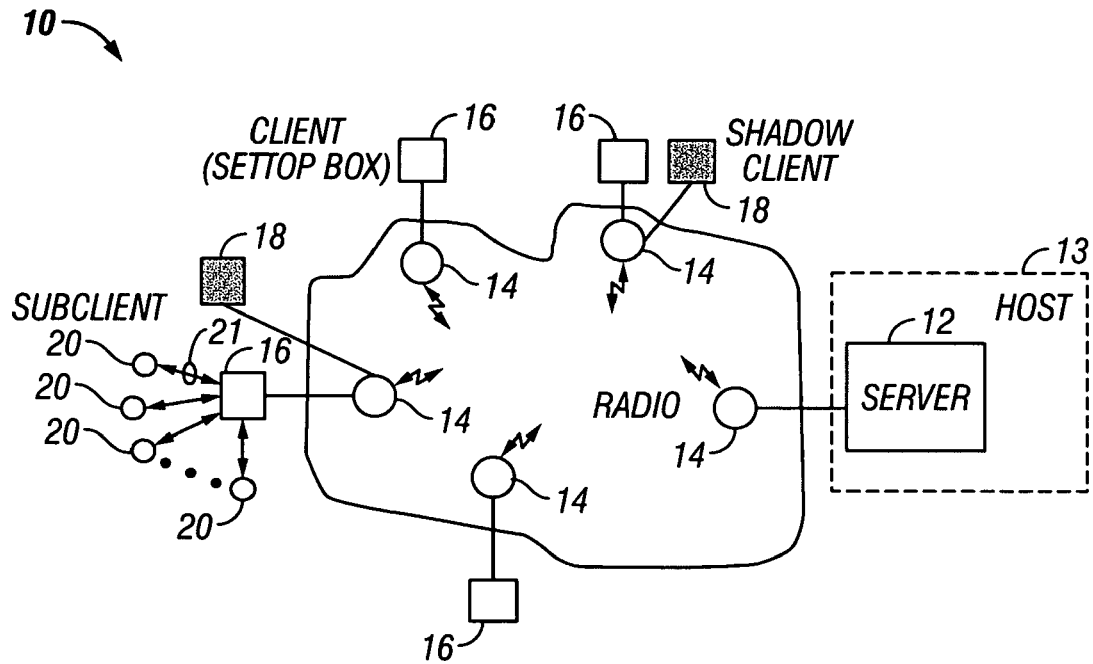
FIG. 1 illustrates a generalized network structure that is supported by a wireless protocol that is one embodiment of the present invention.

Described herein is a network architecture and related protocols for use between (a) a server and associated network clients, and (b) the server and a host computer associated therewith. The present scheme is generally applicable to a variety of wireless network environments, but finds especially useful application in a computer network which is located in a home environment. Thus, the present scheme will be discussed with reference to the particular aspects of a home environment. However, this discussion should in no way be seen to limit the applicability of the present invention to other network environments and the broader spirit and scope of the present invention is recited in the claims which follow this discussion.

As used herein, a "subnet" may describe a cluster of network components which includes a server and several clients associated therewith (e.g., coupled through a wireless communication link). Depending on the context of the discussion, a subnet may also refer to a network that includes a client and one or more subclients associated therewith. In some cases, the term "subnet" is used interchangeably with "cell". In this scheme, a "client" is a network node linked to the server through a wireless link. Examples of clients include audio/video equipment such as televisions, stereo components, satellite television receivers, cable television distribution nodes, and other household appliances. A server may be a separate computer that controls the communication link, however, in other cases the server may be embodied as an add-on card or other component attached to a host computer (e.g., a personal computer). Subclients may include keyboards, joysticks, remote control devices, multi-dimensional input devices, cursor control devices, display units and/or other input and/or output devices associated with a particular client.

Another term used throughout the following discussion is "channel". A channel is defined as the combination of a transmission frequency (more properly a transmission frequency band) and a pseudo-random (PN) code used in a spread spectrum communication scheme. In general, a number of available frequencies and PN codes may provide a number of available channels within a subnet. As will be described in greater detail below, servers and clients are capable of searching through the available channels to find a desirable channel over which to communicate with one another. Table 1 below illustrates an exemplary channel plan according to this scheme.

TABLE 1

| Available Frequency Bands | Available PN Codes | | | |
| --- | --- | --- | --- | --- |
| | PN Code 1 | PN Code 2 | ... | PN Code n |
| Frequency Band 1 | Channel 11 | Channel 12 | ... | Channel 1n |
| Frequency Band 2 | Channel 21 | Channel 22 | ... | Channel 2n |
| . | . | . | | . |
| . | . | . | | . |
| . | . | . | | . |
| Frequency Band N | Channel N1 | Channel N2 | ... | Channel Nn |

TABLE 2

| Tier/Level | Device(s) | Channel Type | Connection Time |
| --- | --- | --- | --- |
| 1 | Subclients (e.g., keyboards, mice, joysticks, and/or other input/output devices) | Wireless (e.g., infrared) or Wired | Online |
| 2 | Clients (e.g., set-top controllers) | Wireless (e.g., radio (RF) channels) | Online |
| 3 | Server (and/or host) | Wireless (e.g., radio (RF) channels) | Online |

In one embodiment, a channel plan using two frequency bands is adopted and details of channel selection within such a scheme is discussed in greater detail below.

With this terminology in mind, the present scheme will be discussed first with reference to an exemplary network topology that may employ a wireless communication link and an associated communication protocol. Second, network operations that make use of an hierarchical structure for data transmitted within a communication channel supported on the wireless link will be described. Third, an exemplary packet structure for use in accordance with the wireless communication link protocol will be discussed. Fourth, a discussion of various network considerations such as overhead, error coding and correction, data encryption, and network initialization and management will be presented.

A. Network Topology

The generalization of the network structure that is supported by the present scheme is shown in FIG. 1. Subnet 10 includes a server 12. As indicated above, server 12 may be a stand-alone unit or, more likely, an attachment card for a personal computer, which serves as a host 13 for the server. Server 12 has an associated radio 14, which is used to couple server 12 wirelessly to the other nodes of subnet 10. The wireless link generally supports both high and low bandwidth data channels and a command channel.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. A client 16 and its associated subclients 20 may communicate with one another via communication links 22, which may be wireless (e.g., infra-red, ultrasonic, spread spectrum, etc.) communication links.

Each subnet 10 may be regarded as a network arranged in an hierarchical fashion with various levels of the hierarchy corresponding to levels at which inter-network component communication occurs. At a highest level of the hierarchy exists the server 12 (and/or its associated host 13) which communicates with various clients 16 via the wireless radio channel. At other, lower levels of the hierarchy the clients 16 communicate with their various subclients 20 using, for example, wired communication links or wireless communication links such as infrared links. This hierarchy may also be described in terms of a three tier structure as illustrated in Table 2 below. As indicated, devices may be added to any level of the network online (e.g., hot insertion during other network operations).

In general, subnet 10 may include the single server 12 and literally any number of clients 16. However, the number of simultaneous clients 16 supported depends on their forward and backward bandwidth requirements. In one embodiment, the wireless link which couples server 12 and clients 16 (e.g., via radios 14) is a full duplex, 10 Mbps link. In other embodiments, the wireless link is a half-duplex, 4 Mbps link. Still other embodiments allow for half-duplex or full-duplex links with different bandwidths.

Figure 2A:
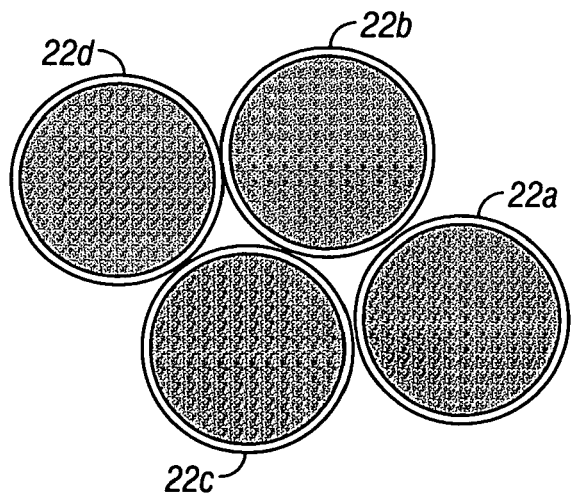
FIG. 2a illustrates a preferable distribution of multiple non-overlapping subnets within an environment.
Figure 2B:
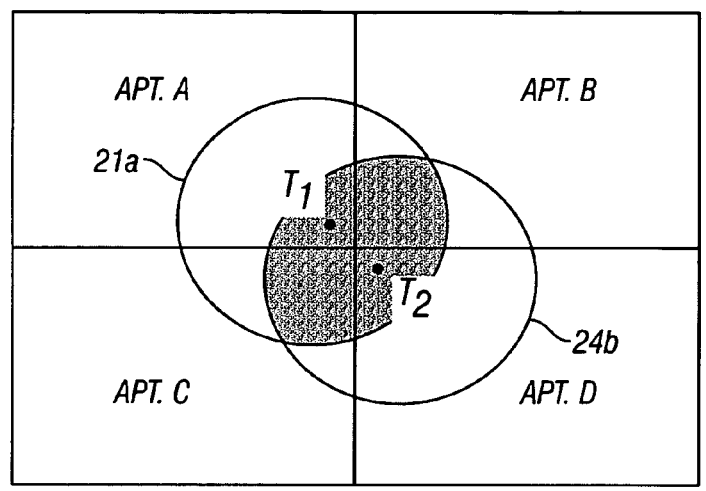
FIG. 2b illustrates an exemplary environment with overlapping subnets.

Radios 14 are preferably configured to allow for intra-subnet communication within a typical home environment. In one embodiment, this means that radios 14 are capable of establishing and maintaining communications within a particular cell area. In one embodiment, a typical cell area may be approximately 100'×80'×30', allowing for communication throughout a typical home environment. The wireless link supported by radios 14 preferably provides at least two separate frequency spaces to support two overlapping cells 22. Thus, radios 14 can operate in one of the available frequency bands. Within the same frequency band, individual subnets (comprised of a server 12 and a number of clients 16 and, optionally, shadow clients 18 and subclients 20) preferably employ code division multiple access (CDMA) communication techniques for intra-subnet exchanges of information. For half-duplex operation, forward and reverse channels over the same frequency band (which employ the same CDMA pseudo-random (PN) code) may utilize dynamically adjustable time division multiplexing (TDMA) to differentiate between transmissions from server 12 and clients 16. Error correction (e.g., using Reed-Solomon encoders/decoders) and data encryption techniques may be employed to provide added robustness and security against eavesdropping To avoid causing high interference between individual subnets, the distribution of multiple subnets 22a, 22b, 22c and 22d within an environment should preferably be non-overlapping as shown in FIG. 2a. However, it is recognized that such ideal scenarios are difficult to guarantee. For example, overlapping subnets may be experienced (indeed, expected) where two different subnets are present in two nearby homes/apartments. Overlapping subnet coverage areas 24a and 24b (having different transmitting units $T_1$ and $T_2$, respectively) such as are illustrated in FIG. 2b may lead to eavesdropping, increased inter-subnet interference, frequent channel changing, etc. Protections against these potential difficulties are addressed below.

Figure 3:
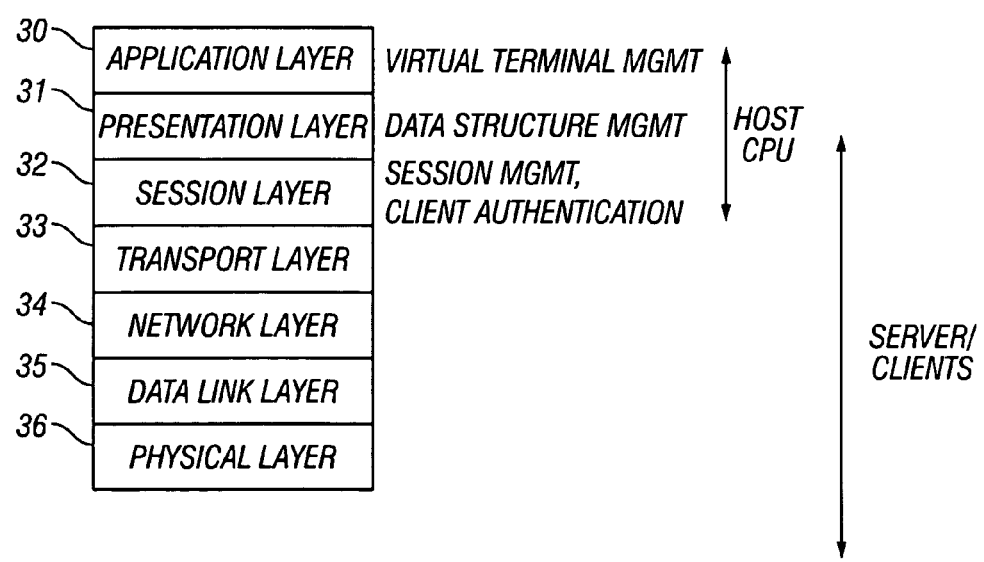
FIG. 3 illustrates an adaptation of the Open System Interconnect (OSI) model to a network architecture configured in accordance with one embodiment of the present invention.

The present protocol scheme may be overlaid on the familiar Open System Interconnect (OSI) model as shown in FIG. 3. The top three layers of the OSI model, application layer 30, presentation layer 31 and session layer 32, are preferably implemented at host computer 13 (i.e., the computer supporting server 12, or server 12 itself where the server is a stand alone unit). The lower layers, transport layer 33, network layer 34, data link layer 35 and physical layer 36, are preferably implemented at server 12 and clients 16 (although there may be some overlap with the host 13 operations).

As discussed above physical layer 36 is preferably implemented as a wireless link using radios 14. Thus, server 12 or client 16 (as appropriate) may handle the initialization of data frame parameters, radio parameters, and the starting of a data frame transmission, however, other services such as data frame formation, and transmit, receive and spreading operations are handled directly by the radios 14.

For one embodiment, e.g., where half-duplex radio communication is used, data link layer 35 may employ a slotted link structure (described in greater detail below), with dynamic slot assignment. Such a structure will support point-to-point connections within subnet 10 and slot sizes may be re-negotiable within a session. Thus data link layer 35 can accommodate data packet handling, time management for packet transmission and slot synchronization, error correction coding (ECC), channel parameter measurement and channel switching. Transport layer 33 provides all necessary connection related services, policing for bandwidth utilization, low bandwidth data handling, data broadcast and, optionally, data encryption. Transport layer 33 allocates bandwidth to each client 16 and continuously polices any under or over utilization of that bandwidth. Transport layer 33 also accommodates any bandwidth renegotiations, as may be required whenever a new client 16 comes on-line or when one of the clients 16 (or an associated subclient 20) requires greater bandwidth. Presentation layer 31 provides video/voice data compression/decompression at server 16 (and/or its host computer 13) and clients 16. In addition, display services are provided at the clients 16.

As will be discussed in greater detail below, this network architecture allows a number of network components (e.g., server 12, clients 16, shadow clients 18 and subclients 20) to be arranged in an hierarchical fashion. At one level of the hierarchy, server 12 and clients 16 operate to exchange information such as multimedia data. At another level of the hierarchy, clients 16 communicate with their respective subclients 20 and may exchange information such as commands that originate/terminate with server 12. At each level of this network hierarchy, the individual network components are communicatively coupled to one another through communication links operative at that level of the hierarchy. For example, discussed in the next section is a protocol operative at the highest level of the hierarchy (i.e., between server 12 and clients 16), which supports dynamic addition of new network components at any level of the hierarchy, according to bandwidth requirements thereof with respect to a communication channel employed at the highest level of the hierarchy. Communication at a lower level of the hierarchy (e.g., between clients 16 and their associated subclients 20) may make use of a similar protocol or any other convenient communication protocol according to the operations performed by the client and its subclients. For example, existing communication protocols for the exchange of information across wireless (e.g., infrared) or wired communication links between subclients and their associated clients may be supported, with any such data being subsequently encapsulated (and/or reformatted if necessary) within data packets to be exchanged according to the protocol discussed below when that information is to be transmitted between a client 16 and server 12.

B. Network Operations

Figure 4:
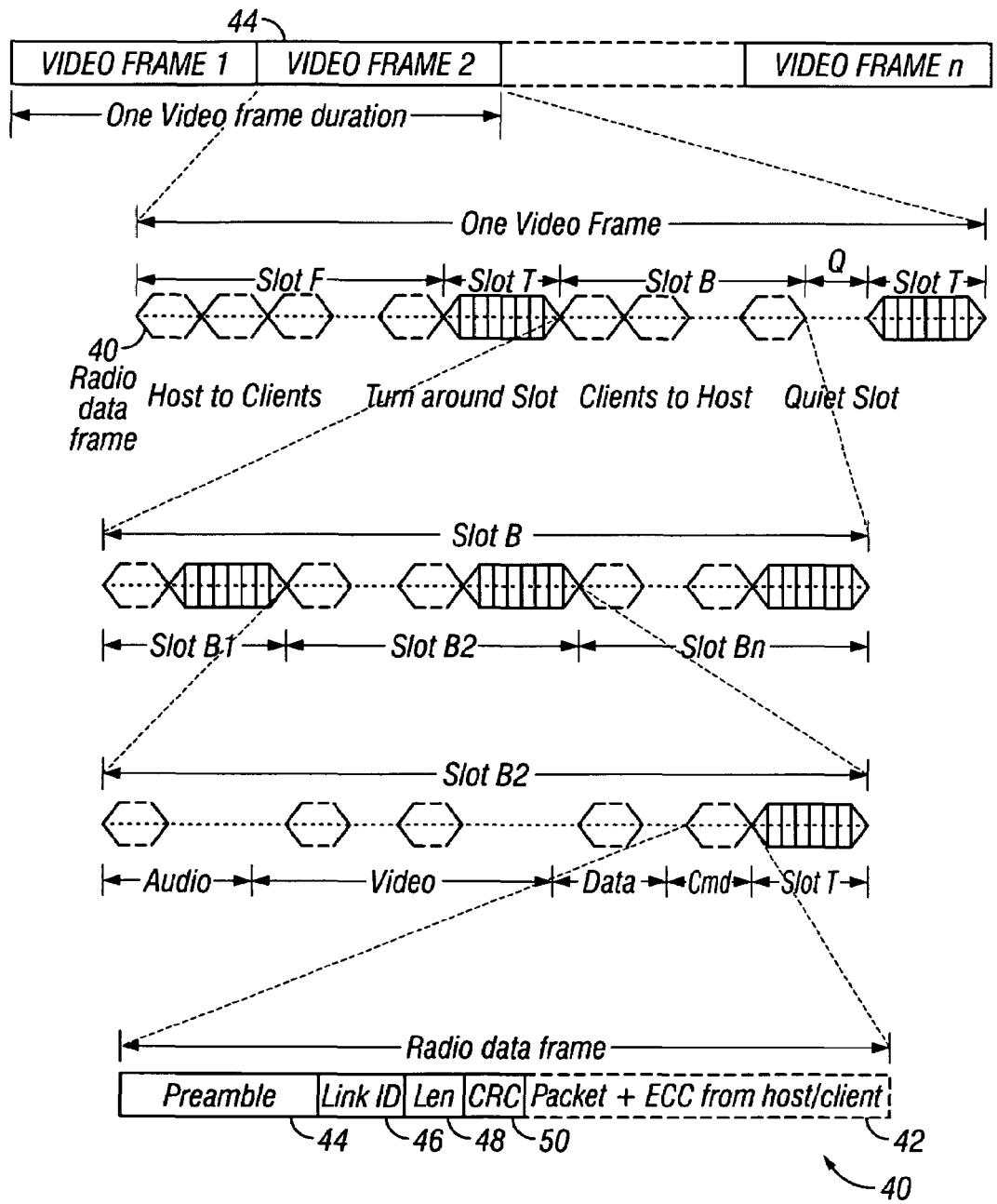
FIG. 4 illustrates an hierarchical arrangement for the transmission of data within a subnet according to one embodiment of the present invention.

Having thus described the basic topology of a network that supports the present scheme, exemplary operations (e.g., for half-duplex operations) for the network will be described. As shown in FIG. 4, these operations utilize an hierarchical arrangement for the transmission of real time, multimedia data (e.g., as frames) within a subnet 10. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated ECC bits. The ECC bits may be used to simplify the detection of the beginning and ending of data packets at the receive side. Variable length framing is preferred over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize PN generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 44 (e.g., of duration 33.33 msec for one embodiment) is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/reception), lossless data (i.e., data that is encoded/decoded using lossless techniques or that cannot tolerate the loss of any packets during transmission/reception), low bandwidth data and/or command (Cmd.) packets. Slot Q is left quiet so that a new client may insert a request packet when the new client seeks to log-in to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/reduce error correction coding (ECC) to cope with the new channel conditions. Hence, depending on whether the information rate at the source is altered, it may require a dynamic change to the forward and backward bandwidth allocation. This is achieved through a Connection Agreement command (discussed further below).

Time slot synchronization between the server 12 and the clients 16 is addressed for four network operational situations: when a client wakes up; when a new client comes on-line; when the channel is changed; and when a client goes absent or shuts down. These situations are explained with reference to various finite state diagrams for the clients 16 and server 12. In the figures, the operational states of the network components are written within the circles. State transitions are made depending on the output of processing involved in the current state and/or the receipt and content of an incoming message. Any received or transmitted messages (i.e., commands) are shown next to the state transition lines. For example "A/B" on a state transition line means that the message "A" was received, to which message "B" was transmitted as answer while transiting to the next state. In other cases, "A" may be the output of the ongoing process and "B" the action taken by the finite state machine. "XX" stands for a don't care action, input or output. A complete description of the various commands referenced in these figures is provided below.

Figure 5:
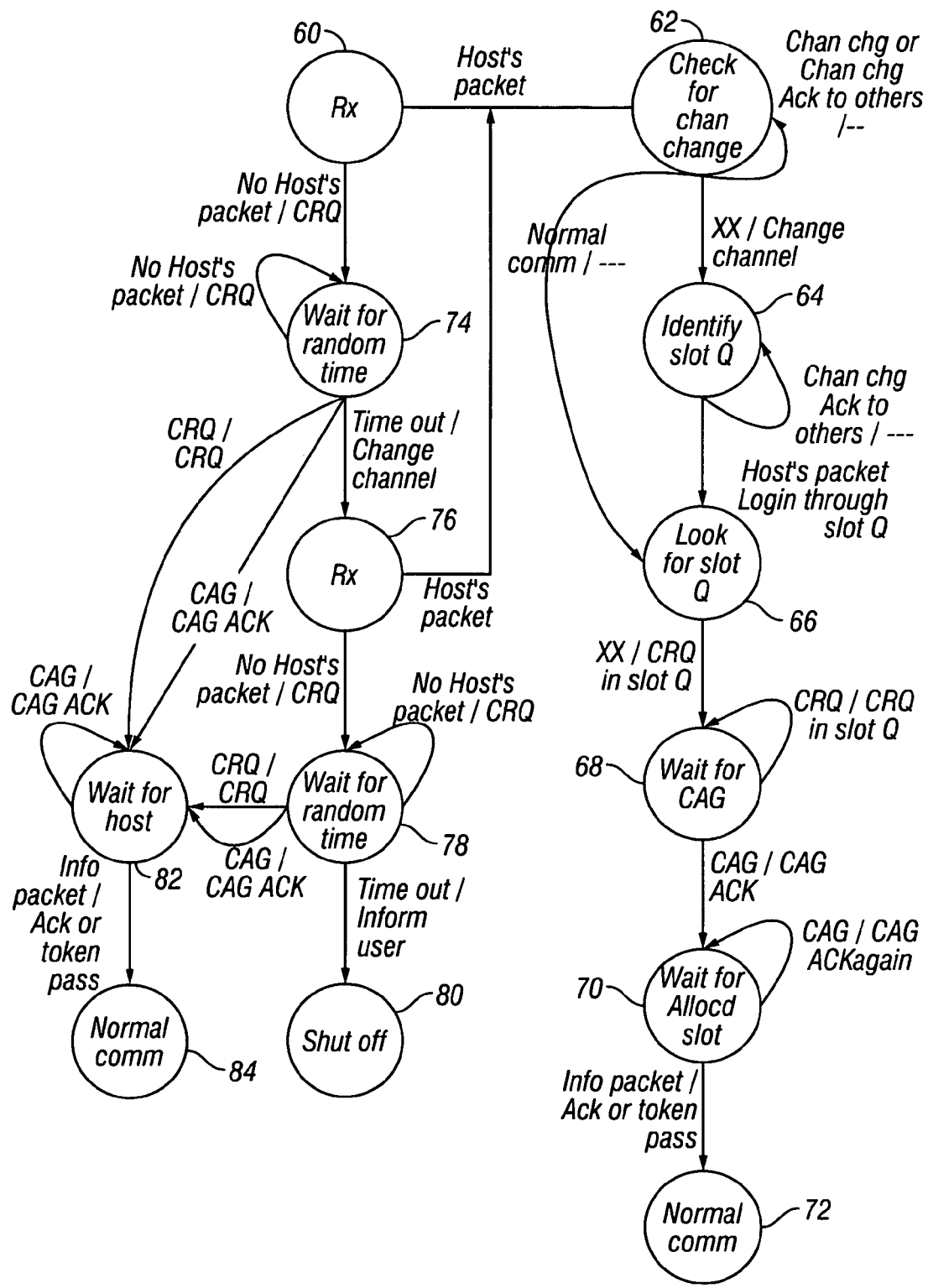
FIG. 5 is a state diagram illustrating a process for adding a client to a subnet in accordance with one embodiment of the present invention.

As shown in FIG. 5, when a client 16 wakes up, it starts out in a receive mode (state 60) and listens to a channel. If the client 16 detects activity on the channel, it listens to determine whether the server 12 is in the process of changing channels (state 62) (discussed further below). If a channel change process is recognized, the client 16 changes channels (state 64) along with the rest of the subnet 10. Of course, if no channel change is in process, the client 16 will detect only normal channel communications. Whether or not the client 16 was required to change channels, the client 16 waits for slot Q (state 66) and sends a Connection Request (CRQ) packet in that slot to the server 12. In response, server 12 checks the consistency of the incoming request (e.g., by sending the same request addressed to transmitting client periodically, perhaps once every video frame, until a response is received).

Once a client's request is confirmed (e.g., by receipt of a confirmation packet from the client, after which the client enters a wait state 68), the server 12 sends a Connection Agreements (CAG) package to the client 16. This package includes, among other things, information regarding the forward and backward bandwidth (e.g., the slots of the channel) to which the new client 16 is entitled. In addition, the maximum number of bytes the new client 16 can send/expect in each data packet is set for each type of packet (e.g., video data, audio data, etc.). The Connection Agreements package may also contain information regarding the total number of data frames that the new client 16 needs to wait from the start of server's transmission and the identification of the preceding client (i.e., the client that owns the preceding reverse transmission slot). All clients honor their respective connection agreements by counting the number of data frames they receive from the start of the server's transmission and start their respective transmissions after the end of last data frame received from the preceding client. While counting, if a client comes across a Token Pass command transmitted by the preceding client, then that client stops counting and immediately starts its own transmission.

After receiving the Connection Agreements packet, the client 16 configures itself to transmit its data in its assigned time slot (e.g., $B_1$, $B_2$, etc.) and waits for that slot to come around (state 70). At the designated time slot, the client 16 may initiate normal communications with the server 12 (state 72) and transmit any data or commands it may have.

The above discussion assumed that the client 16 awoke to find a channel in use. However, it is possible that when the client 16 wakes up, the channel will not be busy. In such cases, the client 16 may transmit a Connection Request packet, hoping that the server 12 will respond, and wait for a random period of time (state 74). If no response is received, the client will change channels. While in receive mode in the new channel (state 76), if the client 16 detects activity, it proceeds to negotiate with the server 12 for bandwidth allocation as described above. Otherwise, if no channel activity is detected, the client 16 will again transmit a Connect Request packet and await a response (state 78). This process may repeat for all available channels until the server 12 is found. If no response is received, the client informs the user that no server is available and powers down (state 80). However, if a response is received from the server 12 in one of the channels, the client negotiates for connection (state 82) and then begins normal communications (state 84) as discussed above.

Figure 6:
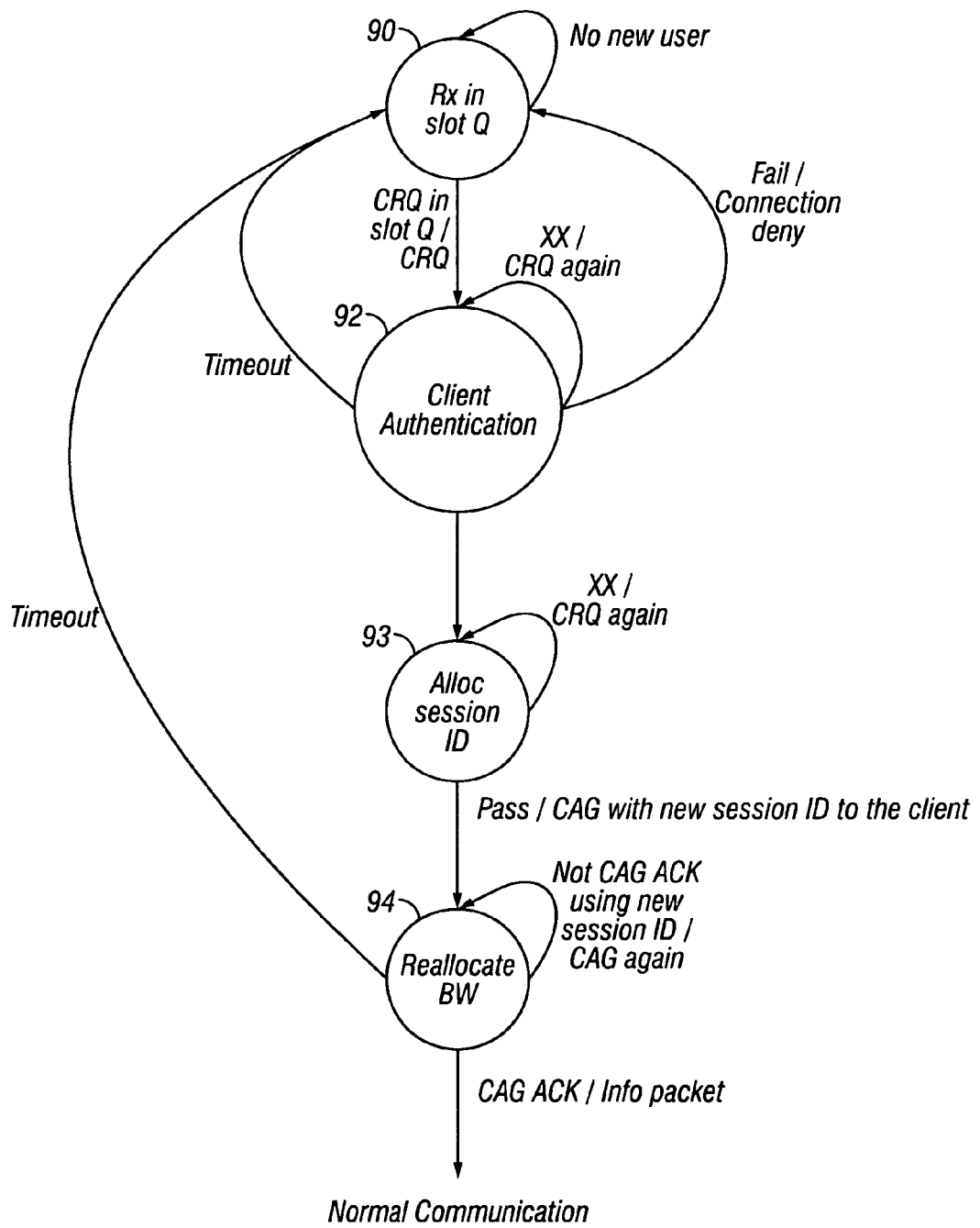
FIG. 6 is a state diagram illustrating a process for inserting a client into a subnet as seen by a server according to one embodiment of the present invention.

From the server standpoint, illustrated in FIG. 6, clients 16 may be inserted on-line. For example, a client 16 may wake up after the server 12 is already operating. The server 12 is configured to listen to slot Q (state 90) for any Connection Request packets transmitted by new clients seeking a connection. After synchronizing with the new client 16 through further exchanges of Connection Request packets, as discussed above, server 12 checks the client's authenticity (state 92) by requesting such authentication from the host computer 13 which stores a list of valid client IDs. If the authentication test passes, server 12 assigns a new session identifier (ID) to the client (state 93) and reallocates the bandwidth for the channel (state 94). The bandwidth reallocation is needed to accommodate the new client. Afterward, the server 12 transmits a Connection Agreement packet to the new client 16, thus initiating normal communications. As illustrated, each state 92, 93 and 94, may have an associated time-out parameter (e.g., maintained using an on-board timer). If at any time a client response is not received within a time-out period, the server 12 may assume that the client 16 has gone off-line and may revert to listening in the Q slot (state 90).

Figure 7:
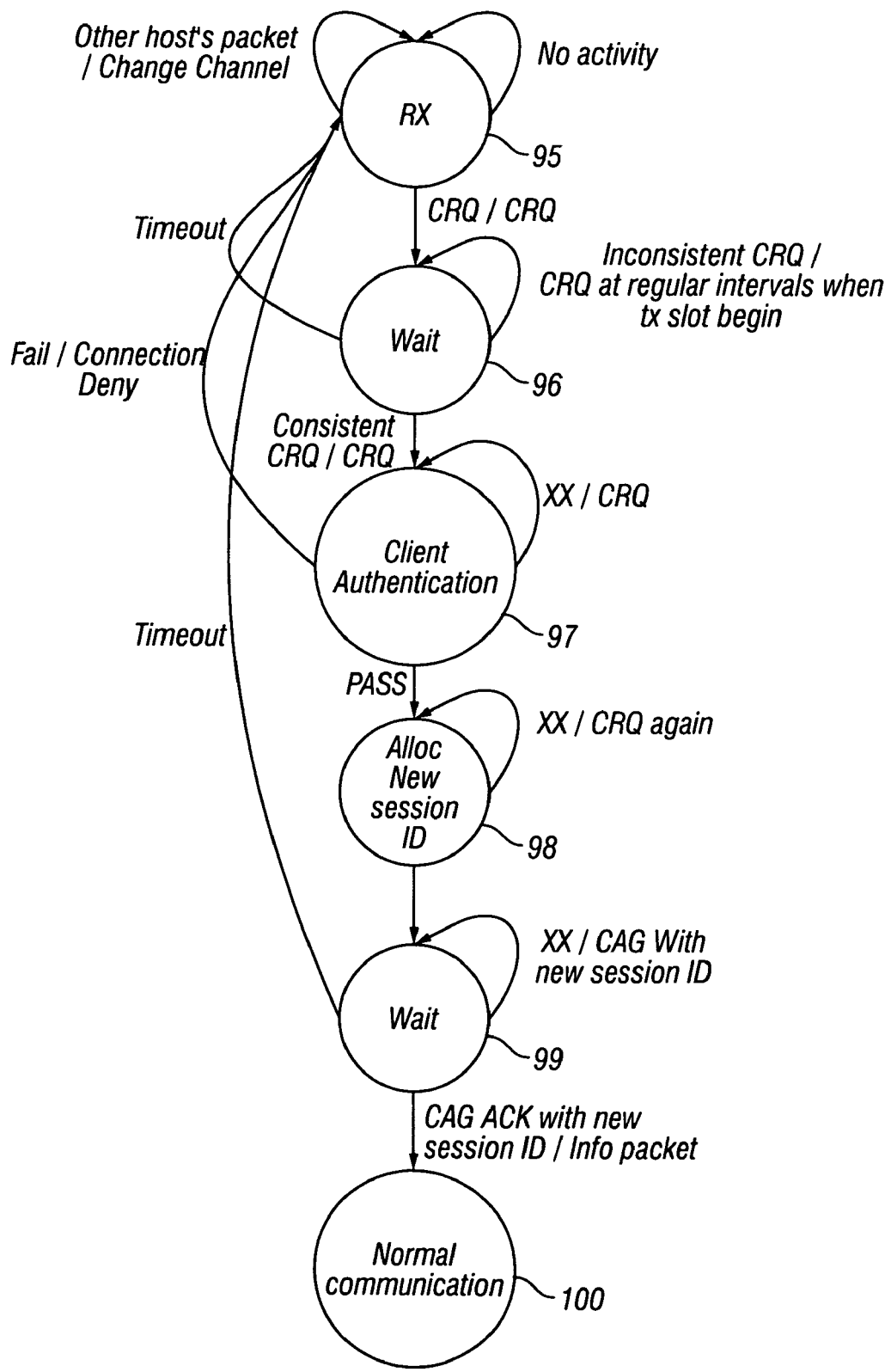
FIG. 7 is a state diagram illustrating a process for a server initiating a session for a new client in accordance with one embodiment of the present invention.

As shown in FIG. 7, when there are no on-line clients 16, the server 12 is configured to park in a free channel and remain in receive mode (state 95) until a client packet is detected. In order to determine whether a channel is free, the received signal strength (provided by radio 14) for each channel is checked and the one with the lowest energy is chosen. Next, any received data is analyzed for the presence of a valid data packet, other than a Connection Request packet. If any other packet is received, especially a packet that is marked as server generated, then the channel is declared busy. On the other hand, if the packets received on a channel do not contain any valid data other than Connection Request packets generated by clients awaiting connection, then the channel is declared free. If no data packets are received at all, the server 12 remains in receive mode (state 95) in that channel and waits for a client's Connection Request packet. In the interim, if the channel is occupied by another subnet in the current server's radio vicinity, that server switches to another channel and waits for a client's request. If all channels are occupied, then the server 12 keeps changing channels periodically until a free channel is found. Note that if a client 16 detect packets from two servers 12 consistently, then the client 16 recognizes that an interference situation is present on the channel and will not establish a connection across the wireless link. Similarly, if a server 12 detects packets from another server consistently, that server will not attempt to establish any client connections on the channel. These two measures ensure that a server from one subnet will not take possession of a client from a nearby subnet. Further, to avoid the capture of a client of one server by another server of a neighboring subnet, unique link identifiers (ID) may be used for each subnet 10.

A client 16 may set the server 12 to action, for example by transmitting a Connection Request packet. The client 16 may then revert to a slave mode (e.g., with a time-out option). Once a client's request is received, the server 12 transmits the Connection Request packet periodically, and waits (state 96) for the client 16 to fall in line as described above. After confirming the client's slave mode through its transmissions, the server 12 tests the client's authenticity (state 97) and, if successful, offers a Connection Agreement to the client 16. If at any time during the authentication process the host computer 13 happens to take more time than the time that is required for the client 16 to respond, then the server 12 may delay the client 16 by re-sending the Connection Agreement packet without actually expecting any acknowledgment from the client 16. After transmitting a Connection Agreement, the server 12 allocates a new session ID (state 98) and then waits (state 99) for the client 16 to acknowledge the transmission. Normal communications may begin thereafter (state 100).

By first making the client a master and then turning it into a slave after the server 12 is awake, low interference on a free channel when the subnet 10 is not operating is ensured. Of course, in other embodiments server 12 may poll for clients 16 at regular intervals across the channel. However, such a scheme keeps the channel busy, even when the subnet 10 is not operating and, hence, may deny the channel to any neighboring subnets.

In some embodiments, multiple clients 16 (or shadow clients 18) are supported with the same input from the server 12. In such cases, only one copy of the forward data packets (with the client ID being that of the first client) need be transmitted. The remaining clients may be treated as shadow clients, with separate command packets from server 12 for each of them.

In multiple client scenarios, when one of the clients 16 wakes up late, it waits for the quiet (Q) slot and begins transmitting its command packets in that slot. However, it is possible that more than one client may wake up after the server 12, in which the present scheme provides a means to resolve potential collisions which may occur if two or more clients 16 each attempt to transmit in the Q slot. To avoid such collisions, clients 16 may randomly choose to (or not to) insert their respective requests in the Q slot. The client 16 that is first recognized by the server 12 will be first added to the subnet 10, and so on.

Table 3 below (in which Tx represents a radio 14 in a transmit state and Rx represents a radio 14 in a receive state) details a multiple client scenario and the generic state diagram for on-line insertion of a new client.

TABLE 3

| Slot Type | Server | Client 1 | Client 2 | Client 3 | ... | Client N | New Client |
|---|---|---|---|---|---|---|---|
| F | Tx | Rx | Rx | Rx | Rx | Rx | Rx |
| T | Tx-to-Rx | Rx-to-Tx | Rx | Rx | Rx | Rx | Rx |
| $B_1$ | Rx | Tx | Rx | Rx | Rx | Rx | Rx |
| T | Rx | Tx-to-Rx | Rx-to-Tx | Rx | Rx | Rx | Rx |
| $B_2$ | Rx | Rx | Tx | Rx | Rx | Rx | Rx |
| . | . | . | . | . | . | . | . |
| . | . | . | . | . | . | . | . |
| . | . | . | . | . | . | . | . |
| $B_N$ | Rx | Rx | Rx | Rx | Rx | Tx | Rx |
| T | Rx | Rx | Rx | Rx | Rx | Tx-to-Rx | Rx-to-Tx |
| Q | Rx | Rx | Rx | Rx | Rx | Rx | Tx |
| T | Rx-to-Tx | Rx | Rx | Rx | Rx | Rx | Tx-to-Rx |
| F | Tx | Rx | Rx | Rx | Rx | Rx | Rx |

Because of the designated time slot arrangement, if one client responds late for some reason, other clients cannot seize its designated time slot. This can cause a waste of precious bandwidth. Accordingly, the present scheme provides a two-fold solution for this problem.

First, each client 16 may be required to keep track of the present client occupying the channel, thereby trying to detect its immediately preceding client in line. If the channel is quiet, the current client waits for a predetermined length of time before starting its own transmission. The waiting time depends on the quiet time threshold allowed between two clients and the number of clients yet to transmit before the current client. This makes use of the order of transmission that is established during the connection setup. The only exception to the quiet time is the Q slot, when all on-line clients 16 should refrain from transmitting.

Second, the server 12 observes any channel takeovers and takes appropriate action to connect/disconnect any consistently delayed client(s). When such a delay in response occurs, a video generating client/server accordingly reduces the size of output data in the next video slot. This allows proper slot time synchronization to be maintained. The video generating client/server keeps track of the idle channel length and reduces its output appropriately in the current/next video slot.

To accommodate a new client, the size of slot Q should be at least as long as one radio data frame 40 carrying a Connection Request packet. Thus, the new client 16 may receive all the data frames, learn the data frame structure in the current session and then insert its request for connection in the slot Q between the transmissions of the last on-line client and the server 12. The request may be confirmed after checking for its consistency over several transactions (i.e., between server transmissions). Note that the radio turn around time needs to be kept in mind and should not be confused with the Q slot. This may be verified using a timer.

In order to inform a new client that the server 12 recognized its connection request, the server 12 needs to send a packet to the new client. Thus, the server 12 needs to ensure that the first client which is supposed to start its transmission following the server (i.e., the client which has been allocated slot $B_1$), should not overlap with the last packet sent by the server 12 for the new client at the end of the F slot. Hence, the server may broadcast a Token Pass at the end of its transmission. The first client in line would then commence its transmission after receiving the Token Pass from the server 12 (and after allowing for a radio turn around time if required) or timing out on an idle channel.

As discussed above, when the channel is changed, all clients 16 need to resynchronize to the server 12. Channel switching may occur when either the server 12 or one of the clients 16 experiences serious channel impairments (e.g., despite antenna diversity and/or a higher degree of ECC). In such scenarios, the server 12 searches for another channel, in an attempt to find a channel where the interference is less severe. If it determines that the new channel offers better prospects for communication operations, server 12 initiates a channel change or switch operation.

Figure 8:
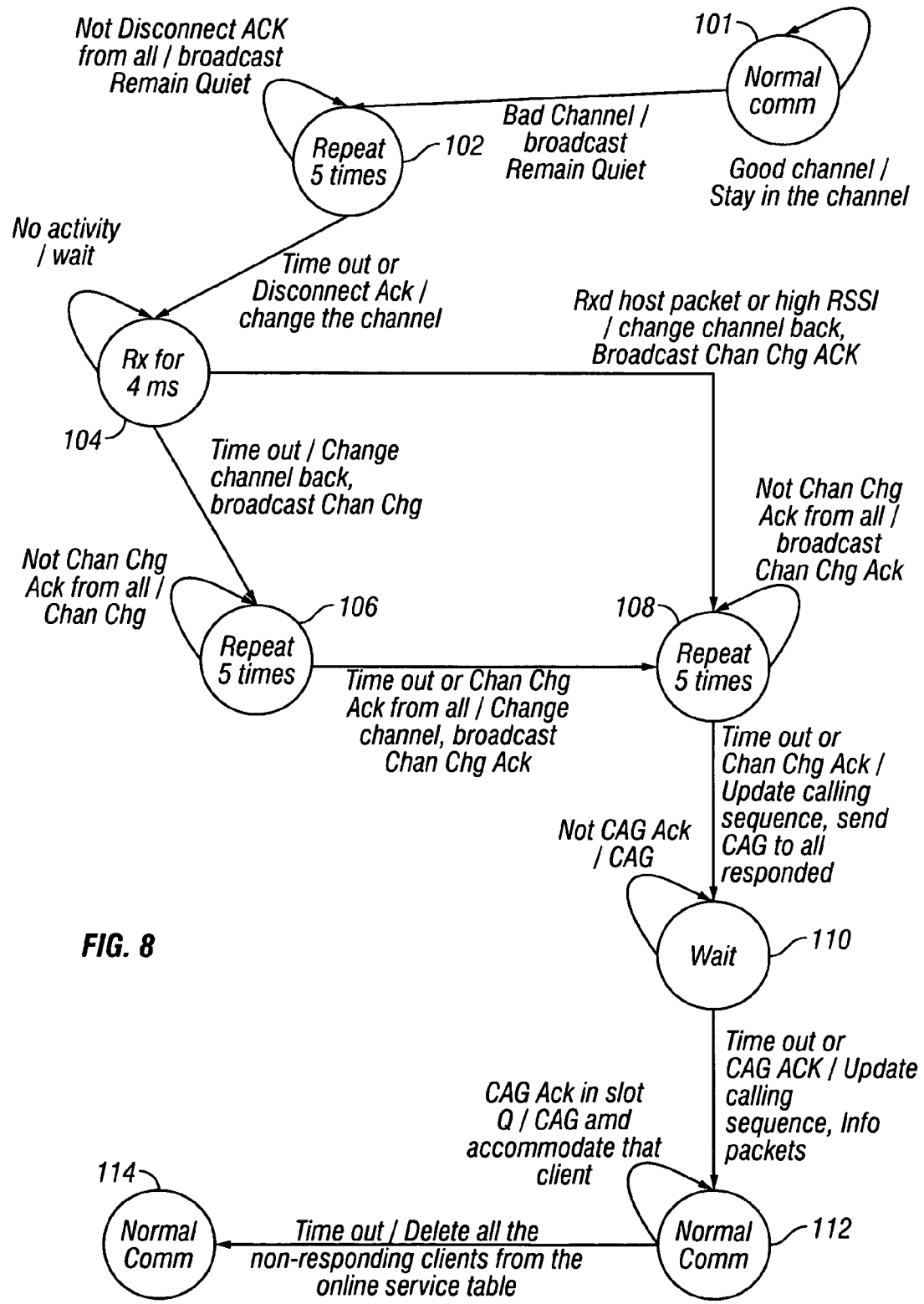
FIG. 8 is a state diagram illustrating a process for changing channels in a subnet as seen by a server in accordance with one embodiment of the present invention.

FIG. 8 illustrates the channel changing sequence for a two-channel subnet, as seen by the server 12. If during normal communications (state 101), server 12 determines that channel conditions are or are becoming unacceptable, before beginning the search for a new channel the server 12 informs all of its clients 16 to remain quiet for a time. This procedure is repeated a number of times (state 102) (e.g., five times), to ensure the message is received by all clients 16. In response, the clients are expected to transmit an acknowledgment, however, even if acknowledgments are not received from all of the on-line clients 16, a timer at server 12 may time-out, allowing server 12 to tune its radio 14 so as to inspect the other channel (state 104). If the new channel is free, the server 12 switches back to the original channel (e.g., after a predetermined listening period, say 4 msec. for one embodiment), broadcasts a Change Channel message (possibly repeatedly, say up to 5 times) to all the on-line clients 16 and waits for the receipt of individual Change Channel Acknowledge (Ack.) messages for the clients 16 (State 106). Each client 16 changes channels only after it sends its Change Channel Ack. message. If, after waiting a predetermined length of time, server 12 still has not received a response from one or more of the on-line clients 16, the server 12 decides that the client(s) is/are unreachable. Similarly, a client 16 may decides that the server 12 is unreachable if, after waiting for a predetermined amount of time, it receives no messages from the server, and may voluntarily change channels. The server 12 switches to the new channel after all the on-line clients 16 respond or after a time-out condition.

Once in the new channel, the clients 16 wait for the server 12 to start communication. The server 12 broadcasts a Change Channel Ack. message (state 108) to announce its presence in the new channel and expects a Change Channel Ack. from each client 16. If one or more clients 16 do not respond within a predetermined number of attempts, the server 12 decides that the client(s) 16 is/are temporarily absent. Accordingly, the server 12 changes the response sequence of the clients 16 (e.g., by transmitting new Connection Agreements) so as to keep out the clients that are absent. After waiting (state 110) for all the clients 16 to confirm their presence in the new channel (or for a time-out period to expire), the server 12 updates the call-respond slot sequence for the new channel and sends new connection agreements to all the clients 16. Normal communication may resume thereafter (state 112).

If a client 16 reaches the new channel late, it needs to wait for the server's call to respond. If the server 12 has already decided the client 16 is absent, the client 16 waits till the resumption of normal communications and then sends a Change Channel Ack. message in the quiet (Q) slot. When the sever 12 receives such a message, it sends a connection agreement and includes the latecomer in the network.

In order to leave any user associated with the late client unaffected during this time, two measures are employed. First, all the clients 16 are configured to provide video frame freeze and/or audio repetition, so as to simulate a smooth session at the user level. Second, the server 12 maintains the session details for a predetermined period, long enough so as to allow for easy reconnection. Only after, the expiration of the predetermined waiting period is an absent client 16 finally deleted from the server's on-line client list (state 114).

If the server 12 receives a Change Channel Ack. message from a very late client 16 after its deletion from the on-line list, then the client 16 is advised to connect anew by sending a Connection Request. In such cases, the client 16 may inform the user that the link was lost. This may appear similar to power glitch at the user level and would prompt the user to re-establish a link with the server 12.

During channel selection (e.g., initially or as part of a channel change operation), the server 12 needs to detect an already operating subnet 10 over the current channel and the potential existence of a link with the same PN code and/or link ID. The probability of such an occurrence is expected to be very low, but it is non-zero. The link ID is assumed to be unique to the link/subnet/cell. To ensure such uniqueness, a user may be prompted to enter a unique password (e.g., a social security number or other unique alphanumeric string of similar length) during the subnet installation. This password may be parsed by the server 12 (and/or its host computer 13) and used to establish a unique link ID and PN code. These values may remain the same for all sessions, unless the user decides to alter them (e.g., by reinstalling the subnet 10).

In one embodiment, 11-bit PN codes (Barker codes) may be used, although higher bit lengths may also be used to ensure uniqueness and thus provide additional security. A table of available PN codes is maintained by the server 14/host computer 13, and one of the codes is chosen based on the password entered by the user. The PN code may be altered whenever there is increased interference due to use of the same PN code in a neighboring subnet 10.

If both the channels are occupied or have large interference, then the server 12 can take one of two actions. If there are fewer clients 16 to/from which the channel interference is severe, then the server 12 may decide to disconnect them. On the other hand, if the number of clients 16 involved is large, then the server 12 may decide to wait for a while and try the channel some time later. In either case, server 12 needs to transmit a Retry Later command to each of the clients 16 involved, until a Disconnect Ack. message is received from each of the affected clients 16.

Figure 9:
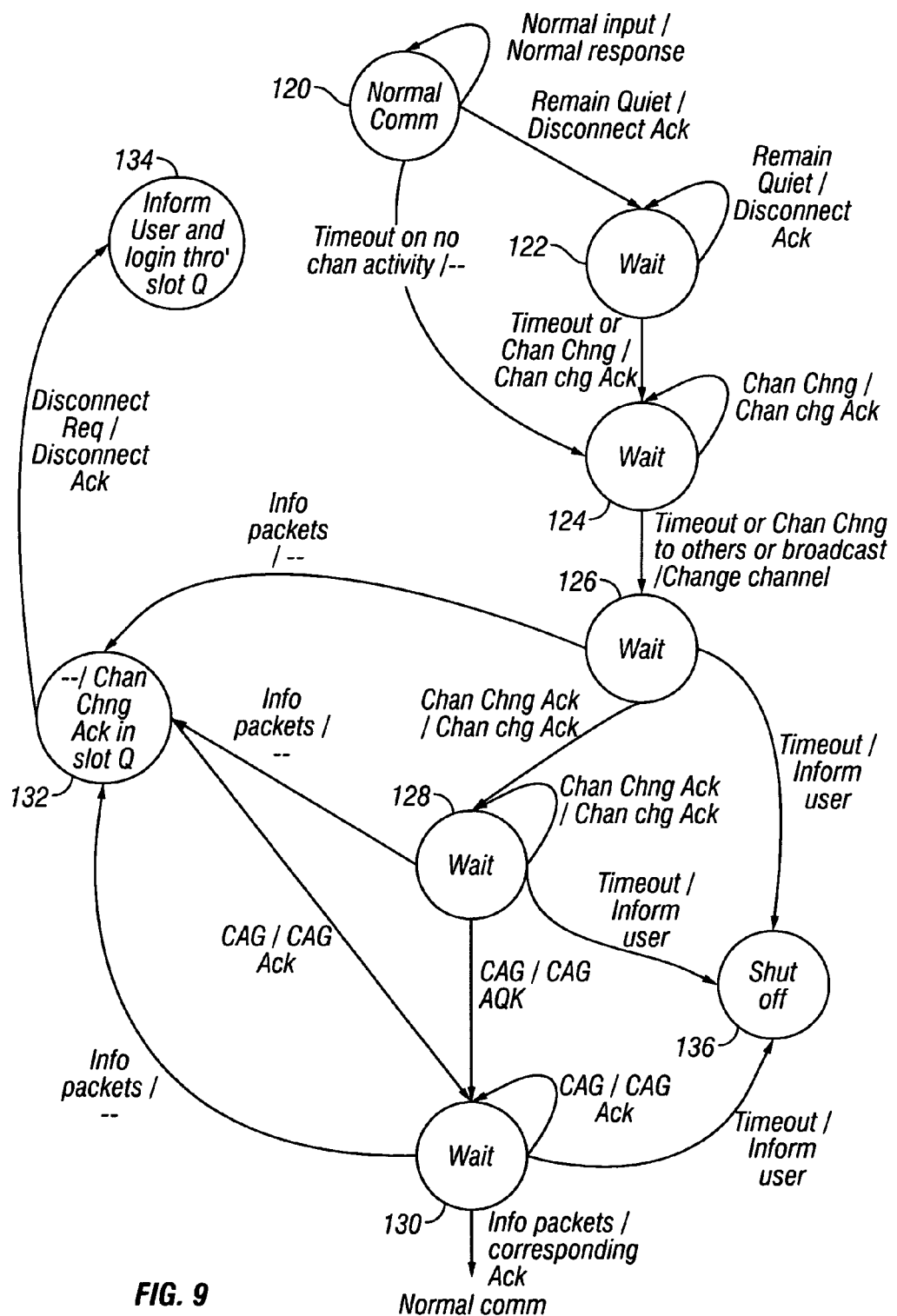
FIG. 9 is a state diagram illustrating a process for the channel changing sequence for a subnet as seen by a client in accordance with one embodiment of the present invention.

FIG. 9 now illustrates a channel switching operation from the client-side for the exemplary two-channel subnet. If during normal communications (state 120), a client 16 is instructed to remain quiet, the client 16 transmits an acknowledgment (e.g., a Disconnect Ack.) and then waits (state 122) for further instructions from server 12. If server 12 broadcasts a Change Channel message, clients 16 acknowledges and then changes channels. Alternatively, a client 16 may decide that the server 12 is unreachable if, after waiting for a predetermined amount of time, it receives no messages from the server, and may voluntarily change channels.

Once in the new channel, the client 16 waits for the server 12 to start communication (state 126). The server 12 broadcasts a Change Channel Ack. message to announce its presence in the new channel and expects a Change Channel Ack. from each client 16. Accordingly, client 16 confirms its presence in the new channel and waits for a new connection agreement from the server 12 (state 128). Upon renegotiating its connection agreement with the server 12, the client 16 waits for normal.communications to resume (state 130).

If the client 16 reaches the new channel late, it needs to wait for the server's call to respond. If the server 12 has already decided the client 16 is absent, the client 16 waits until the resumption of normal communications and then sends a Change Channel Ack. message in the quiet (Q) slot (state 132). When the sever 12 receives such a message, it sends a connection agreement and includes the latecomer in the network. In order to leave any user associated with the late client unaffected during this time, the client 16 may provide video frame freeze and/or audio repetition, so as to simulate a smooth session at the user level.

If the server 12 receives a Change Channel Ack. message from a very late client 16 after its deletion from the on-line list, then the client 16 is advised to connect anew by sending a Connection Request. In such cases, the client 16 may inform the user that the link was lost (state 134). This may appear similar to power glitch at the user level and would prompt the user to re-establish a link with the server 12. During channel selection, if the client 16 loses contact with the server 12 for a prolonged period, it may inform the user of the situation and turn off (state 136).

Figure 18:
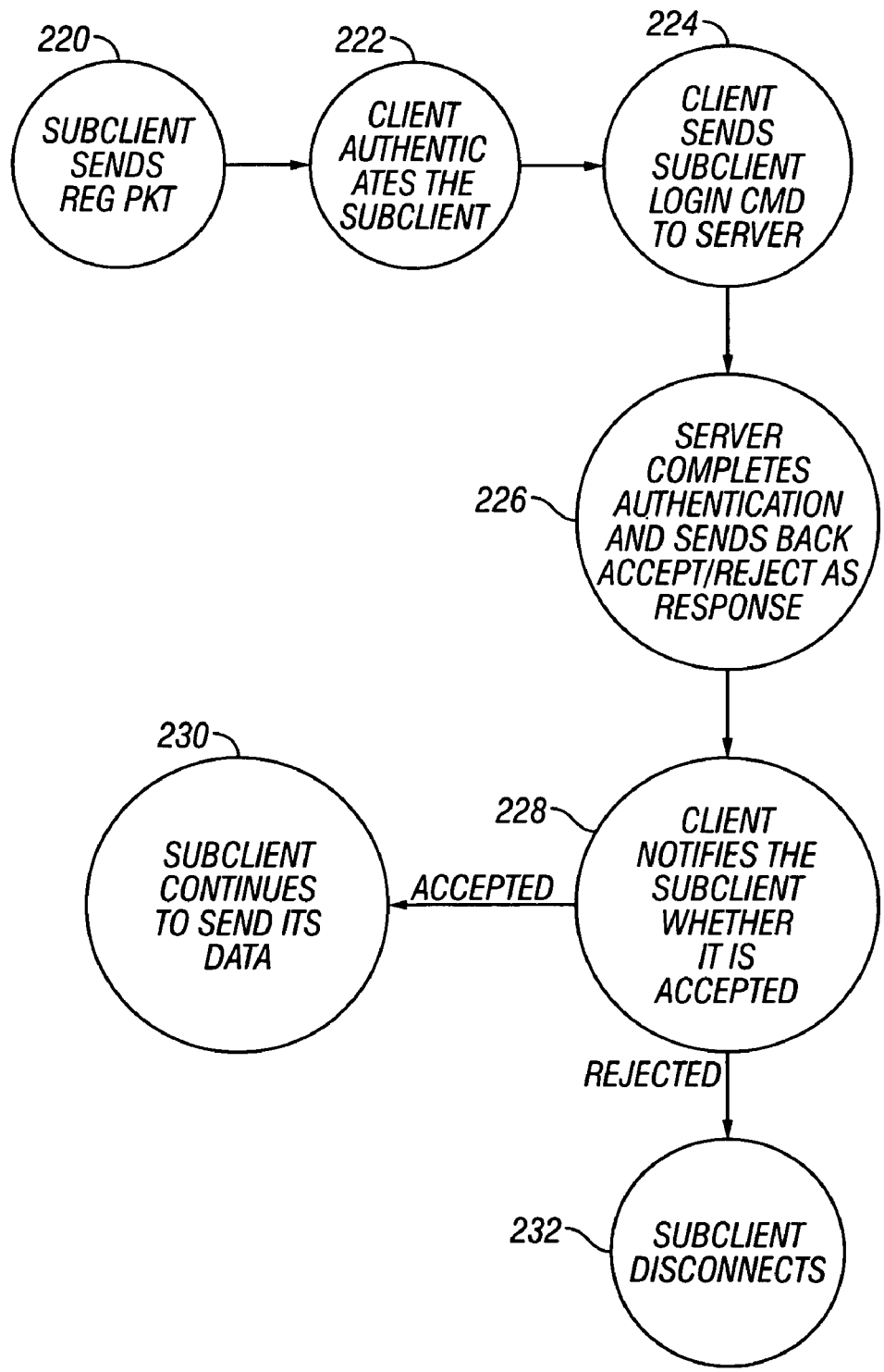
FIG. 18 is a state diagram illustrating a process for online insertion of a subclient into a subnet in accordance with one embodiment of the present invention.

Like clients 16, subclients 20 may also be inserted online into an operating subnet (i.e., also referred to as hot insertion). As shown in FIG. 18, when a subclient 20 wakes up, it sends a registration packet to its associated client (state 220) via a communication link 21. In some cases, communication link 21 may be a wireless link (e.g., an infrared communication link) while in other cases it may be a wired link.

Upon receiving the transmission from the subclient 20, the client 16 authenticates the subclient (state 222), for example by checking its registration identification information against a list of known/authorized subclients. In some cases, this may require communication with the server 12. If the subclient 20 is recognized, the client 16 constructs a subclient session identifier that will uniquely identify the new subclient from any other subclients operating online with the client. Then, the client 16 transmits an Add Subclient command (see further below) to server 12 (state 224). The Add Subclient command includes the subclient session identifier and the characteristics of the subclient as discussed in greater detail below.

Server 12, upon receipt of the Add Subclient command, completes the subclient authentication process (state 226) by recording the subclient session ID and determining whether the subnet can accommodate the addition of the new subclient (e.g., whether sufficient bandwidth on the wireless link is available to accommodate commands sent to/from the new subclient). If the authentication process is successful, the server adds the new subclient to the subnet by inserting it into an online service table and sending the associated client a Subclient Added command. If the new subclient cannot be accommodated or is otherwise rejected, the server sends a Subclient Not Added command.

Whatever the server's decision, the result of the authentication process is transmitted from the client to the subclient (state 228). If the subclient was accepted, it begins normal operation and communicates with its client and server 12 (state 230). If the subclient was rejected, it disconnects (state 232). In either case, a user may be notified of the addition or rejection of the subclient through an appropriate status message displayed on a display device.

During network operations, a subclient 20 may be disconnected by either the server 12 or the associated client 16. For example, if the subclient 20 is inactive for more than a predetermined length of time, the client 16 may disconnect the subclient 20. In such a case, the client 16 should advise the server 12 of the situation and request that the disconnected subclient be removed from the server's list of online devices (see the discussion of the Delete Subclient and Subclient Deleted commands below).

In other cases, server 12 may decide to delete a subclient 20 directly, for example if an application running on the host 13 does not support a particular subclient (or client for that matter). Also, network maintenance and shutdown operations may require that subclients (and clients) be deleted automatically.

C. Network Packet Structure

Figure 10:
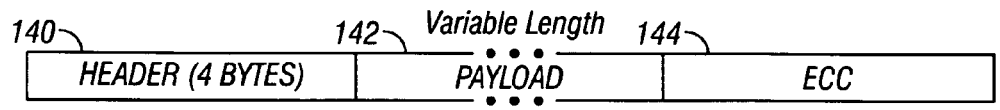
FIG. 10 illustrates a format for a client/server data packet in accordance with one embodiment of the present invention.
Figure 11:
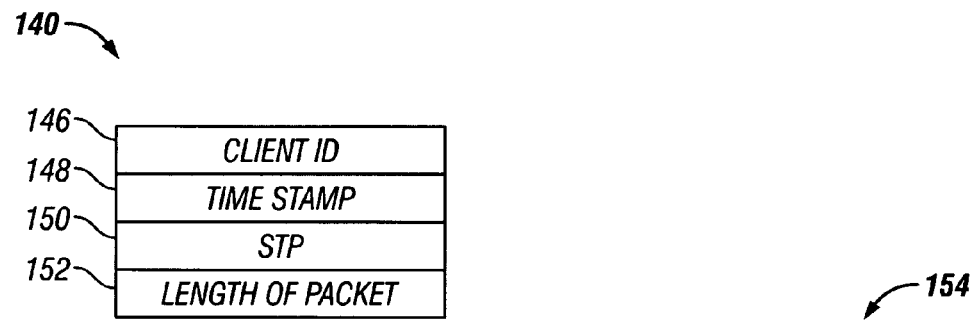
FIG. 11 illustrates a format for a client/server data packet in more detail in accordance with one embodiment of the present invention.

As shown in FIG. 10, packets 42 transmitted across the wireless link have three main parts: a header 140, a variable length payload 142 and an ECC block 144. The header 140, shown in detail in FIG. 11, includes fields for a client ID 146, a time stamp 148, STP 150 and packet length 152. Some packets (e.g., audio packets and some commands) 42 originate at the host computer 13 and, hence, are inputs to server 12. However, server 12 adds a time stamp 148 (e.g., to allow for proper synchronization at the receive side) to these packets 42 before writing them to its associated radio 14.

In one exemplary embodiment, the header 140 is a double word (DWORD, e.g., 32 bits for one embodiment), aligned so that the data writes and reads to/from the packet 42 are less processor time consuming in any of 8/16/32-bit hardware architectures. The client ID field 146 is one byte long and is unique to a client 16 within the subnet 10. This provides support for 255 different clients 16 per server 12. Special client IDs (e.g., all "1s") may be reserved for broadcast purposes while others (e.g., all "0s") may be reserved for the server 12. Time stamps 148 are added so as to synchronize audio and video packets in time. The time stamp 148 may be provided as the output of a time counter that is maintained at the server 12. The clients 16 and the host computer 13 may synchronize their respective time counters using the time stamp 148 provided in an incoming packet.

The STP field 150 provides information on the Source of a packet, the Type of data contained in the packet and the Position of the packet in the current time slot. This is split into three sub-fields (not shown). The higher sub-field (which may be 3 bits long for one embodiment) is used to represent the origin of packet (e.g., all 1s for server 12 and all 0s for a client 16). This field, however, is ignored for communication packets exchanged between server 12 and its host computer 13. When a packet 42 is received, majority logic voting may be performed using the data in this field to determine the origin of the packet 42.

The middle sub-field of the STP field 150 (which may also be 3 bits long for this embodiment) represents the packet type. Supported types include: audio packets, video packets, data packets (e.g., from I/O devices such as keyboards, mice, joysticks, etc.), command packets to/from clients 16 and command packets to/from server 12. The protocol scheme allows for the transfer of video, audio and commands between server 12 and clients 16 and also some low bandwidth data from subclients 20 within a subnet 10. Examples of low bandwidth data include keyboard input, mouse input, analog joystick input, etc. Audio and video are communicated in separate packets and are sent as separate data frames 40 by the radios 14. However, low bandwidth data packets may be combined with command packets to be sent as one data frame 40.

The last sub-field (the Position sub-field) of the STP field 150 may be two bits long and specifies where the packet falls in a group of packets. This field may take on values which represent the following (one value may be a DON'T CARE value):

First Packet: this indicates that the current packet is the first packet transmitted from the source and that there are more to follow.

Continuation Packet: this indicates that there are at least two packets following the present packet from the same source.

One Before the Last Packet: this indicates that there is only one packet following the present packet from the same client 16 (or server 12 in slot F).

Last Packet: This indicates that the current packet is the last packet from the present client 16 (or server 12 in slot F).

Using information in this field, the next client 16 in line for transmission will be able to detect the end of transmission by the preceding client 16 at least one packet early. During the reception of the last packet 42, it instructs its associated radio 14 to switch to transmit mode after that packet.

The length of packet field 152 indicates the number of DWORDs present in the current packet 42. The actual number of DWORDs may be one more than the length indicated in the length field 152, as zero length packets are preferably not used.

The payload field 142 is the body of the packet 42. For audio and video packets, this field contains the compressed audio or video data (as appropriate) from the respective source. For data packets, the payload field includes data generated by an I/O device such as a keyboard or mouse.

Figure 12:
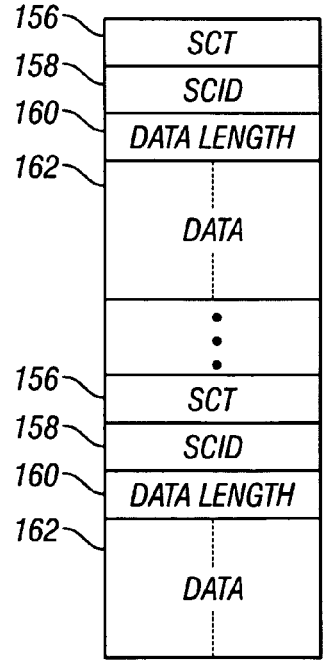
FIG. 12 illustrates a payload structure for a data packet in accordance with one embodiment of the present invention.

The payload structure for a data packet 154 is shown in FIG. 12. Preferably, the subclient type (SCT) 156, subclient ID (SCID) 158 and the data length 160 appear before the actual data 162, so as to help the receive side learn the source of the data generator. More than one set of data 162 may be included within a single data packet 154, so each set of data must have its own SCT, SCID and length parameters.

The SCT field 156 provides the receive side with the type of information source, such as a keyboard, mouse, analog joystick, etc., and the SCID field 158 provides the identification of the individual subclient of that particular subclient type. For example, both a keyboard and a mouse could have similar subclient IDs, but may be differentiated by associating their different subclient types with their respective IDs. This kind of protocol support eases the addition of different kinds of low bandwidth subclients 20 to the same client 16 at any time before or during an ongoing session. Both SCT and SCID fields 156, 158 may be 8 bits wide, thus supporting 256 different types of subclients 20 with up to 256 in each type being connectable to each client 16.

Data requests do not include a length field 160. Data sends do, however, and the length field 160 may be one byte long and will specify the length of the data that follows. The actual low bandwidth data itself 162 follows the length field. For one embodiment, the total length of these packets 154 should not exceed 120 bytes per video frame.

For command packets, the payload field 142 contains a series of commands, each followed by related data bytes, and/or low bandwidth data from subclients 20. Thus, for this embodiment, server 12 compiles all commands that need to be sent across the wireless link to the clients 16 one after another, in one data packet 42. Thus, the maximum number of command packets to be transmitted by the server 12 will be equal to the number of on-line clients 16 it is currently supporting. In contrast, from any client 16 there will be at most only one command packet containing a sequence of commands and/or low bandwidth data from its associated subclients 20 that needs to be sent to the server 12 during each frame.

The commands supported in each direction of communication across the wireless link are discussed below. Unless otherwise stated, for this embodiment no acknowledgment (Ack.) is expected for any of the packets sent from server 12/clients 16. Any number of commands can be stringed together to form a data packet 42, with the only limitation being the size of the overall packet 42. For this embodiment, the total size of the packet 42 should not exceed 80 bytes per video field duration. Other packet sizes may be chosen based on a consideration of the bandwidth requirements of various input devices (e.g., keyboards, mice, joysticks, etc.). The generic payload structure for a command packet 164 is shown in FIG. 13. Each command packet 164 includes a header 166 and "n" command fields 168. Command fields 168 may include a command 170 and any related payload 172, if any). If there is no related payload 172, the command field 168 may be a single byte long. For some commands 170, the related payload 172 may be a predetermined size. Still other commands 170 may have variable length payloads 172. In such cases, the payload length may be specifically indicated prior to (or within) the payload field 172.

1. Commands to/from Clients 16.

A set of commands from server 12 to clients 16 and from clients 16 to server 12 are supported by the present scheme. Server 12 is configured to handle most of the commands independently of its host computer 13. Only decisions involving access to large tables (e.g., which cannot be stored locally by server 12) or user input need to be passed on to (and originate from) the host computer 13. As server 12 reads/compiles each command packet 164, it may decide to keep a copy of the packet for itself when such information would be useful (e.g., for commands like the Connection Agreement, where the server 12 needs to adhere to the same agreed upon constraints for each particular client 16). For one embodiment, the supported commands may include the following:

Connection Request: This is a no payload packet. Each client 16 uses this command to let the server 12 know that it is awake and needs service. The sever 12 responds using the same command. The client 16 and the server 12 repeatedly transmit this command to one another until proper time synchronization is achieved. Once synchronization is achieved, the sever 12 becomes the master and checks the authenticity of the client 16. If the authentication procedure fails, then the server 12 rejects the client 16 by sending a Disconnect Request (Req.) command. The client 16 is expected to respond by sending a Disconnect Ack. On the other hand, if the client 16 is successfully authenticated, then the host computer 13 sends a Client Authentication Pass message to the server 12. The server 12 checks to see if it is possible to accommodate the throughput requirements of the client 16. If not, the server informs the client to retry the connection at a later time by sending a Retry Later command to the client 16. In such cases, the client 16 is expected to respond by sending Disconnect Ack. When the server 12 decides to accommodate the client 16, then it implies the connection grant by sending a Connection Agreements packet to the client 16.

Figure 17:
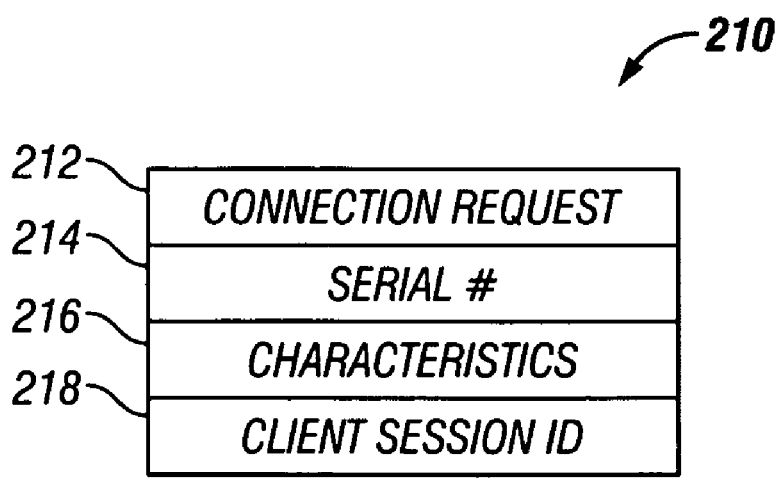
FIG. 17 illustrates an exemplary structure for a Connection Request command packet in accordance with one embodiment of the present invention.

The structure of an exemplary Connection Request packet 210 is illustrated in FIG. 17. Connection Request packet 210 includes a connection request command field 212, a client serial number field 214 and a client characteristics field 216. The information included in the serial number field 214 and the characteristics field 216 serves to identify the individual client to the server 12. Such information may be stored in memory (e.g., read only memory) in the client at the time of manufacture and may include information such as the client type, the manufacturer, driver information and other client identifying information. If the client is to be granted access to the subnet, server 12 may add a client session ID 218 to the packet during its transmission to the client 16. Thereafter, the client may utilize the session ID information in its transmissions to the server 12, rather than having to always retransmit the lengthy serial number and characteristics fields. Thus, the client session ID 218 serves as a shorthand way of identifying the client 16 to the server 12 and also allows the server 12 to uniquely address data and commands destined for a particular client 16 if need be. This allows for an overall bandwidth savings.

Connection Agreements: Server 12 uses this command for three purposes. First, to imply a connection grant to a new client 16 and to specify the terms of the connection (e.g., in terms of server-to-client and client-to-server bandwidths, ECC type, compression type for audio/video information, etc.). Second, when a client 16 receives this command during a session, it implies a compulsory change in the previously negotiated connection agreement (e.g., due to reasons such as poor channel conditions, addition of a new client to the subnet 10, etc.). Third, when the server 12 observes that a particular client 16 is quiet for a predetermined (relatively long) time, then the server 12 sends a Connection Agreements packet without any actual changes to the previously negotiated connection and expects an acknowledgment in return. If no acknowledgment is received after a predetermined number of attempts to contact the client 16, then the client 16 is declared disconnected. Note, in some cases this same command could originate from the client side, for example in cases where the client 16 is not able to cope with the server's data rate.

For one embodiment, the total payload size for a Connection Agreement command is five bytes and the terms of negotiation as included in the packet structure 174 are shown in FIG. 14. The Connection Agreement packet 174 begins with the connection agreement command 176 that identifies the packet. A forward bandwidth field 178 is used to specify the number of packets that the client can expect to receive from the server. A reverse bandwidth field 180 is used to specify the number of packets that the client may send to the server during its reverse transmission slot. These fields also define the video, audio and data bandwidths in each direction. A PCL-ID field 186 specifies the ID of the preceding client (8 bits). The first client that will be allowed to transmit after the server 12 will receive a zero (0) as its PCL-ID. CNUM 188 is client on-line number and lets the client 16 know the number of clients preceding it in the current on-line service list.

SCA (send client attributes) 190 is a control field that is used by the server 12 to inform the client 16 as to whether or not its properties or attributes are needed. For example, if SCA 190 is set to all 1s, this may indicate that the client 16 needs to send its properties to the server 12 (e.g., if the client's profile was erased by accident or is new client installation). The server 12 may repeat the packet (with a change in the time stamp) to acknowledge receipt of these properties, after which the client 16 may send a Connection Agreement Ack. On the other hand, if the SCA field 190 is set to all 0s this may be used as an indication that the server 12 wants the client 16 to adhere to previously defined properties or log-out. If any bit in SCA 190 happens to be corrupted during transmission across the wireless link, then the inherent redundancy in repetition is used at the server 12/client 16 (e.g., by majority logic voting) to determine its actual content.

Connection Agreement Ack: This packet originates at a client 16 and is transmitted in response to a Connection Agreements command. This is a no payload packet.

Add Subclient: Each client 16 is responsible for determining the subclients 20 it needs to support and uses this command to report same to the server 12. This enables the server 12 to allocate the required bandwidth. If bandwidth requirements are met, the server 12 informs the host computer 13 of the subclients 20 so that the host computer 13 can load the related drivers. As shown in FIG. 15, the add subclient packet 192 may contain a command ID 194 as well as the subclient session ID (SS-ID) 196, subclient type (SCT) 197 and subclient ID (SCID) 198. Note that the SS-ID 196 serves a similar purpose as the client session ID discussed above and the SS-ID 196 and SCID 198 may be dynamically allocated by server 12 and the corresponding client 16 as and when a subclient 20 wakes up.

Subclient Added: This command may be sent by the server 12 to the client 16 to indicate the successful inclusion of the new subclient 20. Apart from the command type, SCT and SCID fields similar to those found in an associated Add Subclient command may be used.

Subclient Not Added: This command may be sent by the server 12 to the client 16 to indicate that it is not possible to add a new subclient. The command structure may be the same as the Add Subclient command.

Delete Subclient: The client 16 may time-out any subclients 20 that are not responding and report it to the server 12. Note that in some cases only a selected set of subclients 20 can be timed out. Deleting subclients 20 that are no longer being utilized enables the server 12 to reuse the previously allocated bandwidth and also allows the host computer 13 to unload any related drivers. The packet includes the subclient type and subclient ID and its command structure may be the same as the Add Subclient command.

Subclient Deleted: This packet is transmitted from the server 12 to the client 16 in response to a Delete Subclient command. The command structure may be the same as for the Add Subclient command.

Reset Client: This command originates at the server 12 and requests that the receiving client 16 reset itself and start afresh from the Connection Request stage. This is a no payload packet.

Reset Ack: This is an acknowledgment to the Reset Client conmmand. This is a no payload packet.

Disconnect Request: This command may originate at either the server 12 or a client 16, depending on whether server 12 is removing a client 16 or the client 16 is being turned off. This is a no payload packet.

Retry Later: This command originates at the server 12 to inform a client 16 that due to either severe channel conditions or bandwidth limitations, the client 16 cannot be served at the present time. Upon receipt of such a command, the client 16 may pass the same information to an associated user, thus prompting the user to attempt the connection at a later time. There is no payload for this packet.

Disconnect Ack: This is an acknowledgment to the Disconnect Request and Retry Later commands. This is a no payload packet.

Key Frame Request: This command originates at the receive side of a video transmission and is sent whenever there is a frame loss at the receiving end. Acknowledgment to this command may take the form of a retransmitted key frame from the transmit side. This is a no payload packet.

Channel Status: This command is volunteered at a regular intervals by the clients 16 to inform the server 12 of their channel status. The channel status bytes form the payload of the packet, which may be one byte long.

Token Pass: This is a no payload command and it signals the end of a transmission from the sender. This command prompts the next client 16 (or server 12) to start its own transmission. The server 12 waits for this command from the last client 16 to start its transmission. When the server 12 sends this packet, the client ID is set to all 0s, indicating that the first client 16 in the string should begin its transmission. This may also be seen as a dummy acknowledgment or "client alive" signal, so that the server 12 keeps track of any client 16 shutting off without first informing the server 12. The same command may also be used to indicate completion of a channel change.

Remain Quiet: This is a no payload command and it originates at the server 12. The server 12 uses this command prior to a channel switch to inform all clients 16 to remain quiet until it can check the other channel and return. Each client 16 is expected to acknowledge the command (e.g., by sending Disconnect Ack.).

Change Channel: This is a no payload command and it originates at the server 12. If server 12 determines that the other channel is better than the current one, it informs all the clients 16 to change channels.

Change Channel Ack: This is an acknowledgment transmitted by each client 16 to server 12 in response to receiving the Change Channel command. This is no payload packet. The same command may be used by both server 12 and the clients 16 to confirm completion/abort of a channel change.

New PN Code: This command originates at the server 12 and includes a payload with the new PN code bits and a time mark at which the change is to take effect.

New PN Code Ack: This is an acknowledgment transmitted from each client 16 to server 12 in response to receiving the New PN Code command. Each client 16 may repeat the new PN code to allow server 12 to confirm proper reception. If the two codes do not agree, the server 12 may retransmit the New PN Code command.

2. Commands to/from Host Computer 13.

The host computer's communication with server 12 does not take place over the wireless link and can be seen at two levels. The first level uses conventional hardware ports and low level signaling to communicate conventional low level messages commonly used in computer applications such as "transmission complete", "receiver buffer full", etc. The second level is built upon the first level and uses the above-described network protocol, packet format, etc. and conveys higher level information such as client connection and disconnection, etc. The first level of communication is conventional in nature and will not be discussed further. The second level of communication utilizes the following commands:

Data Request: This command originates at the host computer 13 as a request for the contents of the server's memory. The server 12 responds by providing the data using a Data Send command. The same command is used by the server 12 to fill a particular block of memory with data from the host computer 13. The command structure may be the same as a data send packet, with the exception that the data will not be present.

Data Send: This command may originate at the host computer 13 or the server 12. The host computer 13 uses this command to alter the contents of the data stored on server 12. The server 12 uses this command to supply its data when requested by the host computer 13.

Figure 16:
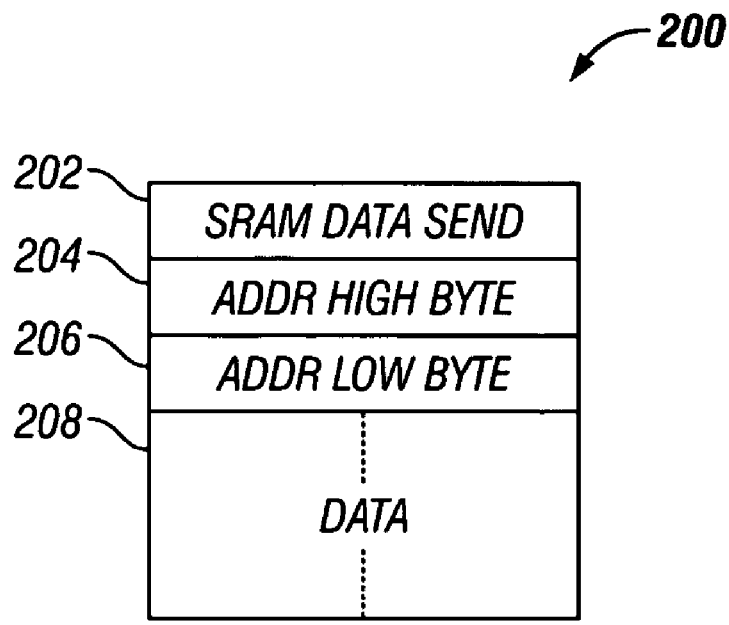
FIG. 16 illustrates the format of a data send packet in accordance with one embodiment of the present invention.

The format of a data send packet 200 is illustrated in FIG. 16. As shown, the packet includes a command ID 202 that identifies the command type. High and low byte address fields 240, 206 are included so as to identify the memory location(s) being accessed. Finally, the data payload 208 itself is provided.

The data request/send commands are supported here (though they may be low level commands in other embodiments) due to the fact that mailbox registers that are commonly used for lower level communication may not be sufficient to store the contents of the server's memory locations.

Client Authentication Pass: This command is sent from the host computer 13 to the server 12, indicating that the client 16 can be accommodated. It may be a no payload command.

Shutdown: The host computer 13 sends this command to the server 12 before it shuts down. The same command may be used during those times when the host computer 13 does not want to support the clients 16 for some reason (e.g., parental control). The server 12 disconnects all the clients 16 and acknowledges the host's command through a Shutdown Ack. This is no payload command.

Shutdown Ack: This is a no payload command originating at the server 12. After this command is passed, the server 12 times out and shuts down. The host computer 13 waits for this acknowledgment (or times out) before shutting down.

D. Network Considerations

At initial start up, the network must be installed. This involves PN code distribution among the subnets 10 (e.g., so as to minimize the use of the same PN code by two neighboring subnets); initiating a list of clients 16 at the host computer 13 (e.g., to enable the server 12 to reject connection request from any uninstalled clients whose properties and bandwidth requirements will be unknown to the host computer 13); distributing client IDs among the clients 16

(e.g., to avoid any confusion among the clients 16 regarding the expected data from the server 12 and their respective transmission slots); and forming a table of estimated bandwidth requirements for each client 16 (e.g., to enable the server 12 to on-line pre-compute any bandwidth requirements before a connection is granted to any particular client 16).

Before introducing any new client 16 to the subnet 10, the list of recognized clients at the host computer 13 should be updated. This may be done directly by a user at the host computer 13 or, in other embodiments, may be accomplished remotely, so long as the client ID is provided to both the server 12 and the new client 16.

During normal operations, it is possible that a client 16 will stop responding. This could lead to catastrophe, as the clients 16 after the one that has gone absent could not use the channel. A two pronged solution is implemented to alleviate this problem. First, if a client 16 does not receive a packet from the previous client in line, it invokes a timer and waits for a predetermined amount of time before seizing the channel. Second, a receive signal strength indication (RSSI) from the radio 14 is also used to check an idle channel so as to avoid false seizures when an associated radio 14 fails to recognize a genuine packet (e.g., due to severe channel conditions).

To solve the problem of more than one client being absent, the wait time during an idle channel is predefined. All the clients keep track of any idle time and seize the channel after waiting an appropriate multiple of the predefined wait time. If K successive clients 16 are absent, then the $(K+1)^{th}$ client 16 takes over after K predefined time periods. Additionally, the server 12 keeps track of any non-responding clients 16 and moves the responding clients 16 appropriately (e.g., by revising their Connection Agreements) to fill any gaps in the channel.

As previously indicated, when a client 16 wakes up after a server 12 is already operating, it needs to check the channel and then respond in the quiet (Q) slot. For this reason, server 12 remembers all the on-line clients 16 for a predetermined time before deleting them from the list of on-line clients, even if the clients are shut down without proper communication to the server 12. When a client is removed from the on-line list, either through a shut down command sequence or a time-out, the bandwidth that is released by the outgoing client is reallocated to needy clients.

When a client 16 wants to disconnect, Disconnect Request is sent to server 12 and the client 16 shuts off after receiving a Disconnect Ack. The server 12 deletes the client from the list of on-line clients after sending the acknowledgment. If the acknowledgment is lost, the client 16 sends another Disconnect Request packet and the server 12, having remembered that the client 16 is already deleted, can send another Disconnect Ack. packet to let the client 16 shut down.

When a client's application is shut down, the client 16 may remain powered up. However, the server 12, having allowed the application to shut down, waits for a predetermined length of time and sends a Connection Terminate command to the client 16 and waits for a Disconnect Ack. packet. In response to the Connection Terminate command, the client 16 will power down and the server 12 will delete the client 16 from the list of on-line clients. The client 16, however, waits for some time before actually powering itself off, as the server 12 could send another Connection Terminate packet if the client's previous acknowledgment was lost.

To implement the above-described protocol, several network factors must be considered. For example, some form of error recognition and correction should be adopted, to ensure against failures due to the noisy, lossy nature of the wireless link that supports the subnet 10. Also, the communication channel should be monitored so that the network can respond to changing channel conditions (e.g., increasing noise, etc.). This allows for the channel switching operations discussed above. In addition, data encryption may be employed to guard against eavesdropping and prevent manipulation of data and/or the subnet configuration by an outsider. These and other considerations are addressed in detail below.

As discussed above, to accommodate error recognition and correction, error correction coding (ECC) may be employed. In one embodiment, ECC coding is accomplished using a Reed-Solomon encoder. Each data packet 42 (including the header) is split into blocks of 239 bytes and ECC is carried out to form 255-byte blocks. If the number of bytes in a data packet 42 is not an integer multiple of 239, then the last block is transmitted with truncated ECC, using a virtual zero coding technique. In this technique, the ECC bytes are computed as if the data was zero padded to complete a block, but the pad bytes are not transmitted. Instead, at the receiver the pad bytes are added and then the data is decoded. For some embodiments, all packets may be treated equally however, in other embodiments audio and command packets may be transmitted with a high degree of ECC while video packets may be unequally protected, depending on the importance of the video data contained in the packet.

To allow for continual monitoring of the channel conditions, each client 16 may keep track of the all the packets transmitted by the server 12 and detect any packet loss using the time stamps on each of the packets. The number of packets lost count may then be voluntarily forwarded to the server 12 approximately once every second (or other time period) and server 12 may use this information to assess the channel conditions. Such channel monitoring may be useful for channel changing decisions and to provide varying error protection. The channel change may be carried out whenever the noise/interference in the current channel becomes unbearable. Increased (or decreased) error protection may be employed to provide better bandwidth utilization and robustness according to the channel conditions.

The present scheme avoids the use of significant overhead (i.e., time spent transferring information other than true data). For an exemplary subnet 10, overhead exists in various forms, including radio turn around times (e.g., 10 μsec or 40 bits at 4 Mbps or 5 bytes); radio data frame diversity); radio data frame headers (e.g., 48 bits, with 16 bits of Link-ID, 16 bits of length information, and 16 bits of CRC); packet headers 140 (e.g., 32 bits, with 8 bits of Client ID, 8 bits of Time Stamp, 8 bits STP, and 8 bits of length field); and Slot Q which is provided for new clients and should be as long as required to carry one connection request packet in every video field duration (e.g., 16 bytes). In order to keep overhead to a minimum, server 12 continually monitors the channel usage statistics and alters the bandwidth allocation among clients 16 accordingly. Thus, the channel is not permitted to sit idle for extended periods of time.

Overhead for a given channel can be estimated for one embodiment as follows. If each radio data frame 40 is restricted to carrying a single packet 42, the overhead for each data frame 40 is 128+48+32+=208 bits=26 bytes. For a subnet 10 with N on-line clients 16 there will be 2N command packets within any video field duration. The maximum payload of each of these packets is limited to 100 bytes. This limit is chosen so as to cater to the typical traffic expected at the mouse, keyboard and analog joystick interfaces, and also provide for other commands. For example, it is expected that the keyboard interface will provide a maximum of 100 words per minute or approximately 10 keystrokes per second. This results in 0.32 bytes/field. But each keystroke is a 16-bit word, leading to a 2-byte payload. The audio (44.1 K samples/sec, stereo, 2:1 compression) is allotted approximately 800 bytes per video field 44. This means that is will fit into one data frame 40. Of course, other values for the above parameters could be used as appropriate to a particular channel/subnet.

Using the above values, the total available bandwidth within a video field 44 may be determined as $4*10^6*16.68335*10^{-3}=66733.4 =8341$ bytes. Audio information is allotted (800+26)=826 bytes of each field 44; command information is allotted (100+26)*2N bytes (for two clients 16 this is 616 bytes); the radio turn around time is set at (N+1)*5 bytes (for 2 clients this is 15 bytes); and the quiet (Q) slot is set at 16 bytes. The video information is allotted any remaining bandwidth, thus for the above embodiment video information is allotted approximately 8341−(826+616+15+16)=6880 bytes (inclusive of overhead). Each radio data frame 40 that carries video information will thus require (1024+26)=1050 bytes. Thus, video information will occupy a total of seven packets, with six of the seven packets being full and one packet being partially filled. The total number of such frames within a video field 44 would therefor be: 2N command, 1 audio and 7 video. For 2 clients, this is 12 data frames. Hence, the overhead is 15+12*26=327 bytes of overhead.

This amounts to 3.92% of overhead out of total bandwidth (8341 bytes) available in one video field duration. Providing another 25% of extra overhead due to any delays involved in radio programming, etc., this becomes 4.9% overhead. Even after adding another 6.275% overhead for ECC, the scheme will include less than 12% of total overhead.

Through the above discussion, it should be clear that server 12 carries out all dynamic network management while the host computer 13 may carry out static network management. Dynamic network management includes bandwidth allocation; network policing for bandwidth utilization (also reported to the host computer 13) and re-negotiations; on-line client list maintenance; and channel selection/changing. Static network management includes all installation related details (e.g., determining Link-ID, PN code, etc.); maintaining client IDs; maintaining channel status and its variation and making decisions for PN code changes (e.g., there should be a table or other list maintained for each client 16 in both directions and it should be updated as and when the channel status is received by the server 12, preferably entries are accumulated over a long time, say a week/month and any decisions are taken based on the accumulated statistics of channel behavior for each client 16 in each direction); and maintaining bandwidth utilization statistics tables and advising the user of same, especially during any new client installations.

Thus, a real time multimedia wireless network protocol has been described. Although discussed with reference to certain illustrated embodiments, the present invention should not be limited thereby. Instead, the present invention should only be measured in terms of the claims that follow.

What is claimed is:

1. A method for a new client joining a wireless network for accessing multimedia data and services from a server, the method comprising:

monitoring the wireless network to determine the presence of network frames, each frame having a duration approximately equal to the duration of a frame of video, and including a server transmission interval for transmissions from the server; a client transmission interval for transmissions from existing clients to the server; and a quiet interval during which neither the server nor the existing clients transmit:

transmitting, by a new client, a connection request message to the server during the quiet interval of the network frame;

receiving from the server an indication that the connection request message has been received by the server;

determining bandwidth requirements of the client;

assigning subintervals within the server transmission and client transmission intervals to the new client for communication between the new client and the server responsive to the bandwidth requirements of the new client and the availability of bandwidth in the wireless network.

2. The method of claim 1, wherein the wireless network is operable on a plurality of channels, and wherein monitoring the wireless network to determine the presence of network frames comprises monitoring each of the plurality of channels.

3. The method of claim 2, further comprising broadcasting a connection request message on a channel in response to failing to detect any network frames on that channel of the wireless network.

4. The method of claim 1, further comprising broadcasting a connection request message in response to failing to detect any network frames on the wireless network.

5. The method of claim 1, wherein the subintervals comprise mini-slots.

6. The method of claim 1, wherein the subintervals are further partitioned into radio data frames.

7. The method of claim 1, wherein assigning subintervals comprises receiving the connection request from the new client; and
transmitting a connection agreement package to the new client in response to the connection request.

8. The method of claim 1, further comprising varying a length of at least one of the server transmission interval and the client transmission interval corresponding to an existing client responsive to bandwidth requirements of the new client.

9. The method of claim 1, further comprising varying a length of the subintervals of at least one of server transmission and client transmission intervals responsive to the availability of bandwidth in the wireless network.

* * * * *